US011827352B2

(12) United States Patent
Miller et al.

(10) Patent No.: US 11,827,352 B2
(45) Date of Patent: Nov. 28, 2023

(54) VISUAL OBSERVER FOR UNMANNED AERIAL VEHICLES

(71) Applicant: SKYDIO, INC., Redwood City, CA (US)

(72) Inventors: Eric Miller, Granville, OH (US); Jacob Daniel Phillips, Boston, MA (US)

(73) Assignee: SKYDIO, INC., Redwood City, CA (US)

( * ) Notice: Subject to any disclaimer, the term of this patent is extended or adjusted under 35 U.S.C. 154(b) by 116 days.

(21) Appl. No.: 17/314,885

(22) Filed: May 7, 2021

(65) Prior Publication Data

US 2021/0350162 A1 Nov. 11, 2021

Related U.S. Application Data

(60) Provisional application No. 63/021,329, filed on May 7, 2020.

(51) Int. Cl.
*G06K 9/32* (2006.01)
*B64C 39/02* (2023.01)
(Continued)

(52) U.S. Cl.
CPC ............ *B64C 39/024* (2013.01); *B64D 47/08* (2013.01); *G05D 1/0094* (2013.01);
(Continued)

(58) Field of Classification Search
CPC .... B64C 39/024; B64D 47/08; G05D 1/0094; G05D 1/1064; G05D 1/12; G06N 3/08; G06N 3/045; G06V 10/25; G06V 10/764; G06V 10/80; G06V 10/82; G06V 20/17; G06V 20/52; H04N 23/695; H04N 23/90; H04N 7/18; H04N 7/181; B64U 2101/30; B64U 2201/20; B64U 10/13; B64U 30/20; G06F 18/25; G01S 3/7865; G01S 5/16; G08G 5/0013; G08G 5/006; G08G 5/0069; G08G 5/0082; G08G 5/045
(Continued)

(56) References Cited

U.S. PATENT DOCUMENTS 10,554,950 B1 * 2/2020 Curlander ............ H04N 13/332
11,170,524 B1 * 11/2021 Mishra ..................... G06T 5/005
(Continued)

FOREIGN PATENT DOCUMENTS

CN 105704437 * 9/2021 ............. H04N 7/181

*Primary Examiner* — Jerome Grant, II
(74) *Attorney, Agent, or Firm* — Mattingly & Malur, PC

(57) ABSTRACT

In some examples, a device may receive, from a first camera, a plurality of images of an airspace corresponding to an area of operation of an unmanned aerial vehicle (UAV). The device may detect, based on the plurality of images from the first camera, a candidate object approaching or within the airspace. Based on detecting the candidate object, the device may control a second camera to direct a field of view of the second camera toward the candidate object. Further, based on images from the second camera captured at a first location and images from at least one other camera captured at a second location, the candidate object may be determined to be an object of interest. In addition, at least one action may be taken based on determining that the candidate object is the object of interest.

20 Claims, 10 Drawing Sheets

(51) Int. Cl.
| | |
|---|---|
| G05D 1/12 | (2006.01) |
| G05D 1/00 | (2006.01) |
| G05D 1/10 | (2006.01) |
| B64D 47/08 | (2006.01) |
| G06N 3/08 | (2023.01) |
| G06V 10/25 | (2022.01) |
| H04N 23/695 | (2023.01) |
| G06V 10/764 | (2022.01) |
| G06V 10/80 | (2022.01) |
| G06V 10/82 | (2022.01) |
| G06V 20/17 | (2022.01) |
| G06V 20/52 | (2022.01) |
| B64U 101/30 | (2023.01) |

(52) U.S. Cl.
CPC ............ *G05D 1/1064* (2019.05); *G05D 1/12* (2013.01); *G06N 3/08* (2013.01); *G06V 10/25* (2022.01); *G06V 10/764* (2022.01); *G06V 10/80* (2022.01); *G06V 10/82* (2022.01); *G06V 20/17* (2022.01); *G06V 20/52* (2022.01); *H04N 23/695* (2023.01); *B64U 2101/30* (2023.01)

(58) Field of Classification Search
USPC .......................................................... 382/103
See application file for complete search history.

(56) References Cited

U.S. PATENT DOCUMENTS

| | | | |
|---|---|---|---|
| 11,249,182 B2* | 2/2022 | Luders | ................. G01S 7/4026 |
| 2016/0078759 A1* | 3/2016 | Nerayoff | ............. G08G 1/0175 701/3 |

* cited by examiner

VISUAL OBSERVER FOR UNMANNED AERIAL VEHICLES

CROSS-REFERENCE TO RELATED APPLICATION

This application claims the benefit of U.S. Provisional Patent Application No. 63/021,329, filed May 7, 2020, which is incorporated by reference herein.

BACKGROUND

Unmanned aerial vehicles (UAVs), sometimes referred to as "drones", can be used to capture images or perform other operations from vantage points that would otherwise be difficult to reach. UAVs typically are operated manually by a human using a specialized controller to remotely control the movements and image capture functions of the UAV. More recently, UAVs are being operated autonomously or semi-autonomously, and do not require the operator to maintain constant manual control of the UAV.

In some situations, depending on the location at which the UAV is being operated, a human visual observer may be required by law, regulation, local ordinance, or the like, when the UAV is in flight. For example, in the USA, the Federal Aviation Administration (FAA) has promulgated US Code of Federal Regulations 14 CFR Part 107 (hereinafter "Part 107"), which describes the responsibilities of a human visual observer. These responsibilities may include scanning the airspace where a UAV is operating for any potential collision hazards. However, it may not always be practical to have a human visual observer present when a UAV is operating. For instance, it may be desirable for one or more UAVs to be able to operate autonomously within a designated area for performing various operations at any time of the day or night regardless of whether a human being has a direct visual line of sight of the UAV.

BRIEF DESCRIPTION OF THE DRAWINGS

The detailed description is set forth with reference to the accompanying figures. In the figures, the leftmost digit(s) of a reference number identifies the figure in which the reference number first appears. The use of the same reference numbers in different figures indicates similar or identical items or features.

DESCRIPTION

Figure 1:
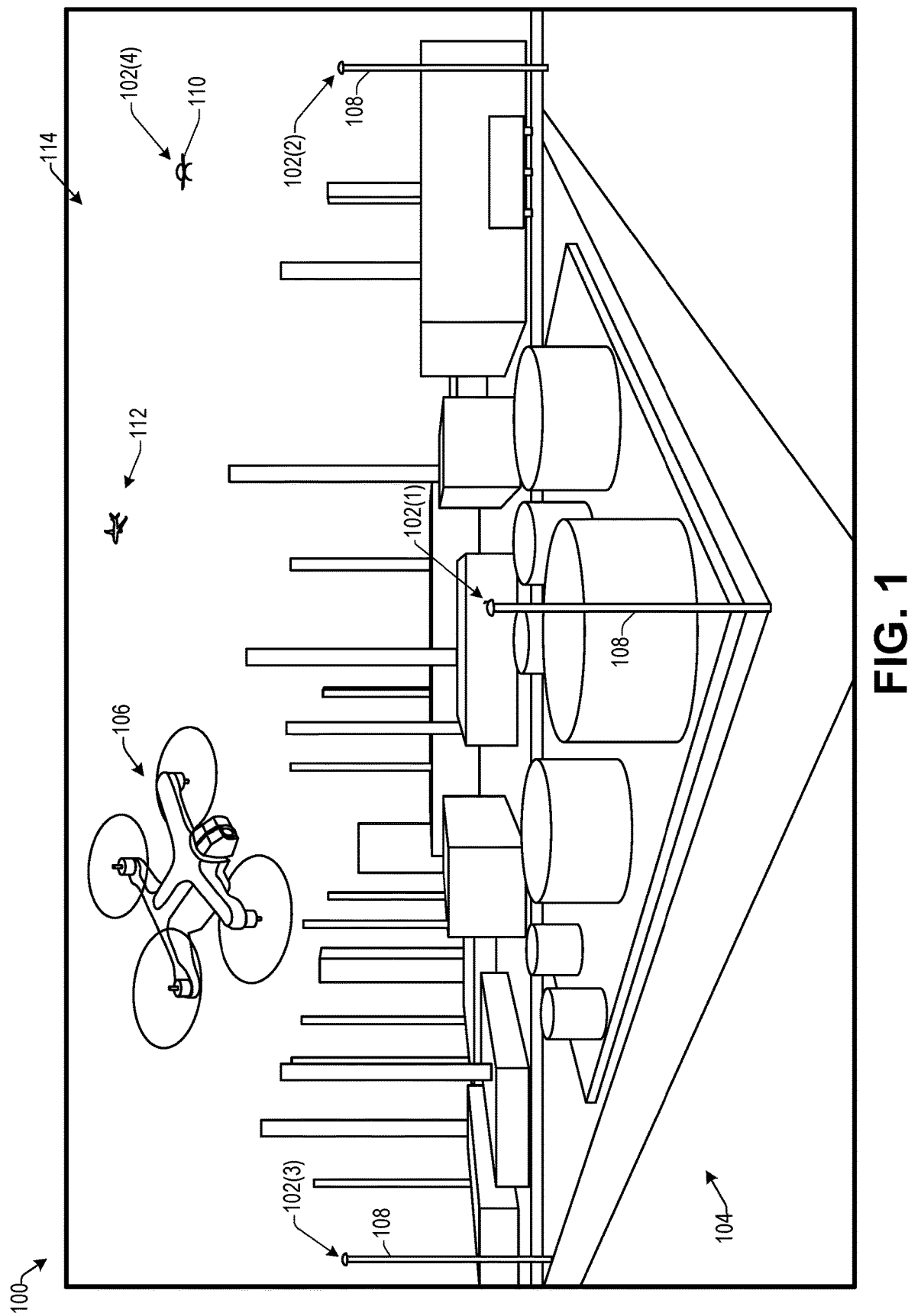
FIG. 1 illustrates an example environment of operation of an observation system according to some implementations.

Some implementations herein are directed to techniques and arrangements for operating a UAV, such as in flights beyond the visual line of sight ("BVLOS") of an operator, at high altitudes, or in an autonomous unattended setting where there may not be a Part 107 or equivalent certified pilot or human visual observer physically near the UAV or able to have a direct line of sight of the UAV. For example, the system herein may be configured to detect and avoid manned aircraft, unmanned aircraft, and other objects in the airspace in the vicinity of the UAV or other designated area for meeting safety and regulatory requirements.

Some examples herein provide a digital visual observation capability that is afforded by one or more observer devices that may be deployed at a designated area to perform the function of a human visual observer. For instance, the observer devices may be positioned at locations around a designated area to provide coverage of the designated area for monitoring the airspace and for also providing a visual line of sight of any UAVs that may be operating in the designated area. Additionally, in some examples, one or more of the observer devices may themselves be mounted on UAVs or other vehicles to provide one or more mobile observer devices in addition to, or as an alternative to, one or more ground-based observer devices.

Each observer device, whether ground-based or mobile, may be equipped with a plurality of high-resolution fixed cameras that may be positioned to cover at least a hemispherical field of view around the observer device. In addition, the observer device may include a high resolution movable camera that is mounted on a motorized gimbal to be aimable at a region of interest for obtaining more detailed images of the region of interest and for tracking any object detected in the region of interest. For instance, the movable camera may include a telephoto lens having a fixed focal length for a fixed level of optical magnification or, alternatively, an optically zoomable and controllable level of optical magnification. As one example, recognition processing may be performed on the images captured by the plurality of fixed cameras to initially detect a possible region of interest that may contain a moving object. Based on the initial recognition, the movable camera may be aimed at the region of interest to detect and track any aircraft or other objects of interest that may be near or entering the airspace of the designated area.

As another example, the moveable camera may be aimed in sequence at regions of interest deemed high-risk for containing an object, such as for detecting objects that are too small to be detected by the fixed cameras. For instance, even though the fixed cameras may not currently be detecting any candidate objects, an observer device may operate the movable camera to scan areas that are likely to contain objects of interest. As one example, the areas likely to contain an object of interest may be determined based on historical recognition results, such as may be stored in a database of recognition results maintained by a service computing device, or the like.

Further, the observer devices may include ADS-B-in (Automatic Dependent Surveillance-Broadcast-in) capabilities and/or technologies for receiving information from aircraft equipped with cooperative radio frequency transmitters, such as Mode A/C aviation transponder communications, or any other type of aircraft location/altitude identifying communication technologies that may enable detection and avoidance of aircraft. For example, ADS-B is an aerial surveillance technology in which each aircraft determines its own position, such as via satellite navigation (e.g., global positioning system) or other sensors. The aircraft may periodically broadcast its own position as an ADS-B signal, which enables the aircraft to be tracked by devices that receive the ADS-B signal. The ADS-B communications broadcast by an aircraft can be received by the observer devices herein to determine the location of any aircraft in the vicinity of the designated area. As one example, each observer device may include an ADS-B-in receiver and/or other cooperative aviation information receiver. Alternatively, the observer devices may receive an ADS-B-in feed (or other aviation information receiver information) over a wired or wireless network from an ADS-B receiver (or other cooperative aviation communications technology receiver) located at or near the designated area at which the observer devices are located.

Further, in some examples, additional types of sensors, such as acoustic sensors, radar, lidar, thermal sensors, or the like, may be employed in one or more of the observer devices in addition to the fixed cameras and the movable camera. The observer devices may communicate via wired or wireless communications with other observer devices, a service computing device, one or more UAVs, and/or a user computing device for detecting and responding to objects in the designated airspace. Additionally, in some cases, the system may be configured to detect and avoid people or objects on the ground, such as in the event of an unexpected landing of the UAV, operation of the UAV close to the ground, or the like.

One or more of the observer devices may be installed in or around a designated area of operation within which one or more UAVs may be configured to operate. For example, each observer device may be operated to scan the sky when at least one UAV is flying. The observer devices may be programmed or otherwise configured to automatically look for aircraft or other objects that may be entering the designated area within which the UAV is operating. Should an aircraft or other object be detected by an observer device, the observer device may notify the UAV directly and/or notify a remote operator so that an appropriate action may be taken.

In some examples, recognition results, other information determined by the observer devices, and/or live images/video, may be provided to a user, such as an operator of a UAV. For example, the received information may provide the user with a third person perspective of the UAV and the surrounding area in real time. In some cases, the UAV may generally operate autonomously, such as according to one or more algorithms, programs, or the like. For instance, a human user may be able to assume control of, or otherwise send control signals to the UAV in some cases, but normally may permit the UAV to perform its programmed functions autonomously.

In some implementations, the system herein may include a full array platform in which there may be one or more ground-based observer devices and one or more UAV-mounted observer devices. For example, the UAV(s) having observer devices mounted thereon may be configured to fly to selected positions around or within the designated area and may be landed in a selected location, may hover in stationary positions at the selected locations, may fly along a preconfigured path, or may fly autonomously with respect to the designated area, such as to observe other UAVs, and/or to adjust to various conditions detected by the onboard observer device or conditions detected by other observer devices in the observation system.

In some examples, one or more mobile UAV-mounted observer devices may be operated in cooperation with the ground-based observer devices to provide a more complete surveillance of the designated area of operation of the UAV. Accordingly, some examples of the observation system herein may include a combination of observer devices on the ground and in the air. The observer devices may be in communication with one or more service computing devices and/or user computing devices for collectively monitoring airspace and, in some cases, the ground of a designated area for enabling the safe operation of one or more UAVs in the designated area.

In some examples, the observation system may perform functions that are analogous to the functions performed by a human visual observer such as may be required in some situations by the US FAA or other regulatory agencies. For instance, the observation system may be able to perform operations superior to those of a human both in perceptual resolution and practical detection of incursions into the airspace of the designated area. Implementations of the observer devices herein may each include the plurality of high resolution fixed cameras, the gimbal-mounted movable camera, and, in some cases, may further include onboard radar devices or other sensors. In addition, in some examples, a human user may be able to serve as a remote visual observer by receiving the images captured by the observer devices for providing additional monitoring redundancy.

Each observer device may include onboard processing capability for locally processing received images, such as for performing recognition functions to detect possible targets entering the airspace of the designated area. For instance, the observer device may receive, as inputs, ADS-B signals and multiple high resolution video feeds for onboard processing. In addition, in some examples, signals from additional sensors may be employed such as from an onboard radar device, lidar, or other sensors for providing additional sensing capability. Further, in some examples, video and other sensory input from one or more existing networks of cameras, radars, ADS-B-in receivers, and/or other sensors or monitoring devices in a given area, e.g., around an airport, a city, etc., may be utilized for providing additional sensing capability.

In some cases, a two-or-more-stage recognition pipeline may be employed such as to provide inexpensive and fast change detection and/or other techniques that may be employed to quickly detect moving specks corresponding to candidate objects in captured images, or regions of an image likely to contain undetected moving objects. When a candidate object is initially detected, a more computationally expensive second stage recognition process may be used to analyze image patches surrounding the detected candidate object.

In addition, a third stage may be performed that includes physically pointing the movable camera at the candidate object/region of interest for obtaining higher-quality images that may be used for performing additional recognition processing to make a decision as to whether to confirm or reject the candidate object as being an actual object of interest that is entering, or already within, the designated area. For instance, the detected object may end up being a bird or the like rather than an aircraft, and upon recognition, may be ignored. If an actual object of interest is detected, in some cases, the UAV(s) in the designated area may be sent an instruction to perform an action such as landing, moving to a different location, or the like. Furthermore, in some cases, additional sensors may be included with the movable camera and may be movable with the movable camera. For example, other sensors such a thermal camera, lidar, etc., may be mounted on the gimbal with the movable camera. Thus, when the gimbal is controlled to point the movable camera at a region of interest, these other sensors may also be pointed at the region of interest.

In some examples, in addition to the observation system performing automated processing for autonomously observing and managing the UAV in the designated area, the observation system may transmit video streams over a network connection to a user such as a remote operator. For instance, the user may manually confirm or reject moving object detections, may provide instructions to the UAV based on the received video, and/or may take over control of the UAV. Further, the video feeds may be transmitted to the user at a lower resolution and/or framerate than the raw feeds received at each observer device to enable transmission of the video feeds in real time over a reasonable (lesser) bandwidth of the network.

For discussion purposes, some example implementations are described in the environment of observing the airspace of a designated site, location, facility, region, or other type of area, such as to detect incursions into the airspace by objects of interest. However, implementations herein are not limited to the particular examples provided, and may be extended to other types of objects, other types of sensors, other types of areas, other environments of use, other device configurations, other processing algorithms, and so forth, as will be apparent to those of skill in the art in light of the disclosure herein.

FIG. 1 illustrates an example environment of operation of an observation system 100 according to some implementations. In this example, one or more observer devices 102 are positioned in relation to a designated area 104. In the illustrated example, the designated area 104 may be an oil refinery, but implementations herein are not limited to any particular configuration or type of designated area 104. The observation system 100 may be configured to perform a visual observer function for one or more UAVs 106 using the one or more observer devices 102. For instance, when the UAV 106 is in flight, the observation system 100 may be configured to perform visual observation of the UAV 106 and surrounding airspace in a manner to satisfy the visual observer requirements of Part 107 or similar regulations, laws, rules, or the like. For example, the UAV 106 may perform any of various inspection operations, surveillance operations, tracking operations, imaging operations, and so forth, as is known in the art.

In this example, some of the observer devices 102 are ground-based observer devices and at least one observer device 102 is a mobile observer device. In particular, observer devices 102(1), 102(2) and 102(3) are ground-based observer devices that are mounted on supports 108, while observer device 102(4) is a mobile observer device that is mounted on a UAV 110. The supports 108 may include one or more of turrets, stands, poles, towers, buildings, structures, or any other suitable type of support able to support the observer device(s) 102 in a position that is elevated sufficiently to have a view of at least a portion of the airspace of the designated area 104.

In some examples the UAV 110 that supports the mobile observer device 102(4) may be a dedicated UAV 110 that serves solely as transport for the observer device 102. In other examples, the UAV 110 may also perform other functions. In some implementations, the UAV 110 may fly to a designated location and may maintain a position at the designated location for performing observer functions. As another example, the UAV 110 may change its position as the UAV 106 that is being observed changes position. Further, in some cases, the ground-based observer devices 102(1), 102(2), and 102(3) may send additional location information to the mobile observer device 102(4) to enable the mobile observer device 102(4) to maintain an intended position more accurately with respect to the designated area 104 and/or the UAV 106. In addition, in some examples, rather than having a mix of ground-based observer devices and mobile observer devices, all of the observer devices 102 may be ground-based, or alternatively, all of the observer devices 102 may be mobile.

As discussed additionally below, e.g., with respect to FIGS. 2-4, each observer device 102 may include a plurality of fixed cameras (not visible in FIG. 1). Each fixed camera may have a field of view pointed in a different direction, such as for providing a combined overall hemispherical field of view (or more or less, depending on the application). Furthermore, a movable camera (not visible in FIG. 1) may be included with one or more of the observer devices 102 that may be operable by software on the observer device 102 and/or that may be remotely operable by a user (not shown in FIG. 1) to be movable to pan, tilt, zoom, or the like to aim the movable camera at an area of interest that may include a detected object 112 that could potentially enter the airspace of the designated area 104. The airspace over the designated area 104 may be referred to as a designated volume 114, which is a volume of space that is protected by the observer devices 102 against entry by the object 112, which may pose a collision risk to the UAV 106 or vice versa.

Once the object 112 is detected and determined to be an object of interest, the movable camera may be controlled to track the object 112. Examples of objects 112 that may be targets of sufficient interest for tracking by an observer device 102 may include manned and unmanned aircraft, including airplanes, helicopters, drones, hot air balloons, weather balloons, blimps, parachutes, hang gliders, ultralights, or the like, that may enter the airspace of the designated area 104. On the other hand, smaller flying objects, such as birds, bats, etc., may be ignored following recognition by an observer device 102, such as within a threshold level of confidence.

The observer devices 102 may be positioned around or within the designated area 104 for observing operation of the one or more UAVs 106 within the designated area 104 and for scanning the airspace associated with the designated area 104. For instance, the one or more UAVs 106 may be configured to operate autonomously within the designated area 104, such as for performing any of various known operations, e.g., performing inspection of equipment or infrastructure, monitoring equipment or infrastructure, taking images or video of one or more portions of the designated area 104, or the like, as discussed elsewhere herein. Numerous other possible operations performed by the UAV(s) 106 will be apparent to those of skill in the art having the benefit of the disclosure herein.

In some examples, a user (not shown in FIG. 1) may be located remotely from the UAV 106 and/or the designated area 104. For example, the user may be associated with a controller or other user computing device (not shown in FIG. 1) that may be used to manage operation of the UAV(s) 106 and, in some examples, the observation system 100. For instance, the user computing device may have one or more associated displays, and may receive communications from the observer devices 102, which may include video feeds or other communications such as recognition information in the case that user verification of an object 112 entering the airspace is requested by one or more of the observer devices 102.

As mentioned above, the observation system 100 may generally operate autonomously to ensure safe operation of the one or more UAVs 106, which may also operate autonomously within the designated area 104 observed by the observation system 100. Furthermore, the UAV mounted observer device(s) 102 may employ their own observational capabilities, respectively, as well as the observational capabilities of the other observer devices 102 in the observation system 100 for ensuring that the UAVs 110 that transport the respective observer devices 102 are also operated autonomously and safely within the designated area 104.

Each observer device 102 may include at least one processor (not visible in FIG. 1) configured to locally process received images, such as for performing recognition functions to detect possible objects 112 entering the designated volume 114 corresponding to the designated area 104. For instance, the observer device 102 may receive as inputs ADS-B signals and multiple high resolution video feeds for onboard processing. In addition, in some examples, signals from additional sensors may be employed such as from an onboard radar, lidar, microphone, or other sensors for providing additional sensing capability.

In some cases, the observation system 100 may be configured to perform a two-or-more-stage recognition processing to provide inexpensive and fast detection of changes in the captured images. As one example, each observer device 102 may continually receive and perform recognition on images from the plurality of cameras to attempt to recognize any airborne objects that may be in, entering, or likely to enter the designated volume 114 corresponding to the designated area 104 and the airspace of the designated area 104. As discussed additionally below, a first computer vision algorithm may be performed as a first stage recognition process on the received images to enable an observer device 102 to quickly detect moving specks as candidate objects in received images. When a candidate object is detected by the first stage, a more computationally expensive second computer vision algorithm may be used as a second stage recognition process, such as by analyzing image patches surrounding the detected candidate object. As one example, the second computer vision algorithm may include using a machine learning classifier to classify any object recognizable in the cropped area. A third stage recognition process may include controlling a gimbal of the movable camera to point the movable camera at the candidate object for tracking the candidate object to obtain higher-quality more detailed images that may be analyzed using a third computer vision algorithm, such as a machine learning classifier, for additional classification and recognition processing.

Further, in some cases, the observer device 102 may communicate with other ones of the observer devices 102 to cause the other observer devices 102 to also scan an indicated region of interest. Further, the observer devices 102 may send images to a selected observer device 102 to enable the selected observer device 102 to process images from multiple ones of the observer devices 102 to obtain more accurate image processing results, such as to enable parallax processing of images taken from two or more different points of view to determine more accurately a distance and/or size of the candidate object. Alternatively, as another example, the images and/or data from one or more of the observer devices 102 may be sent to a service computing device (not shown in FIG. 1), such as a local server, a cloud-based server, or the like, which may perform processing on images and/or data from the one or more observer devices 102.

Based on the recognition processing, the observer device 102 may determine whether to confirm or reject the candidate object as being an actual object of interest that may enter or that is already within the designated volume 114. If the object 112 is classified as an object of interest, the observer device 102 may take one or more actions, such as sending an alert to a user computing device (not shown in FIG. 1) to enable user evaluation of the identified object 112 and or to enable the user to take control of the UAV 106. Additionally, or alternatively, the observer device 102 may send an alert to the UAV 106, may send a control signal to cause the UAV 106 to perform an action such as landing, moving to a different location, changing a flight path, and so forth.

In addition, the observation system 100 may transmit images or live video streams over a network connection to a user who may be remote from the UAV 106. For instance, the user may manually confirm or reject detections of moving objects and/or may use the images to provide instructions, such as control signals to the UAV 106, or may take over control of the UAV 106. In some cases, the video feeds from the observer devices 102 may be transmitted to the user computing device at a lower resolution than the high-resolution feeds received at each observer device 102 to enable transmission of the video feeds in real time over a lower bandwidth of the network than would be the case if the full resolution images were transmitted.

Figure 2:
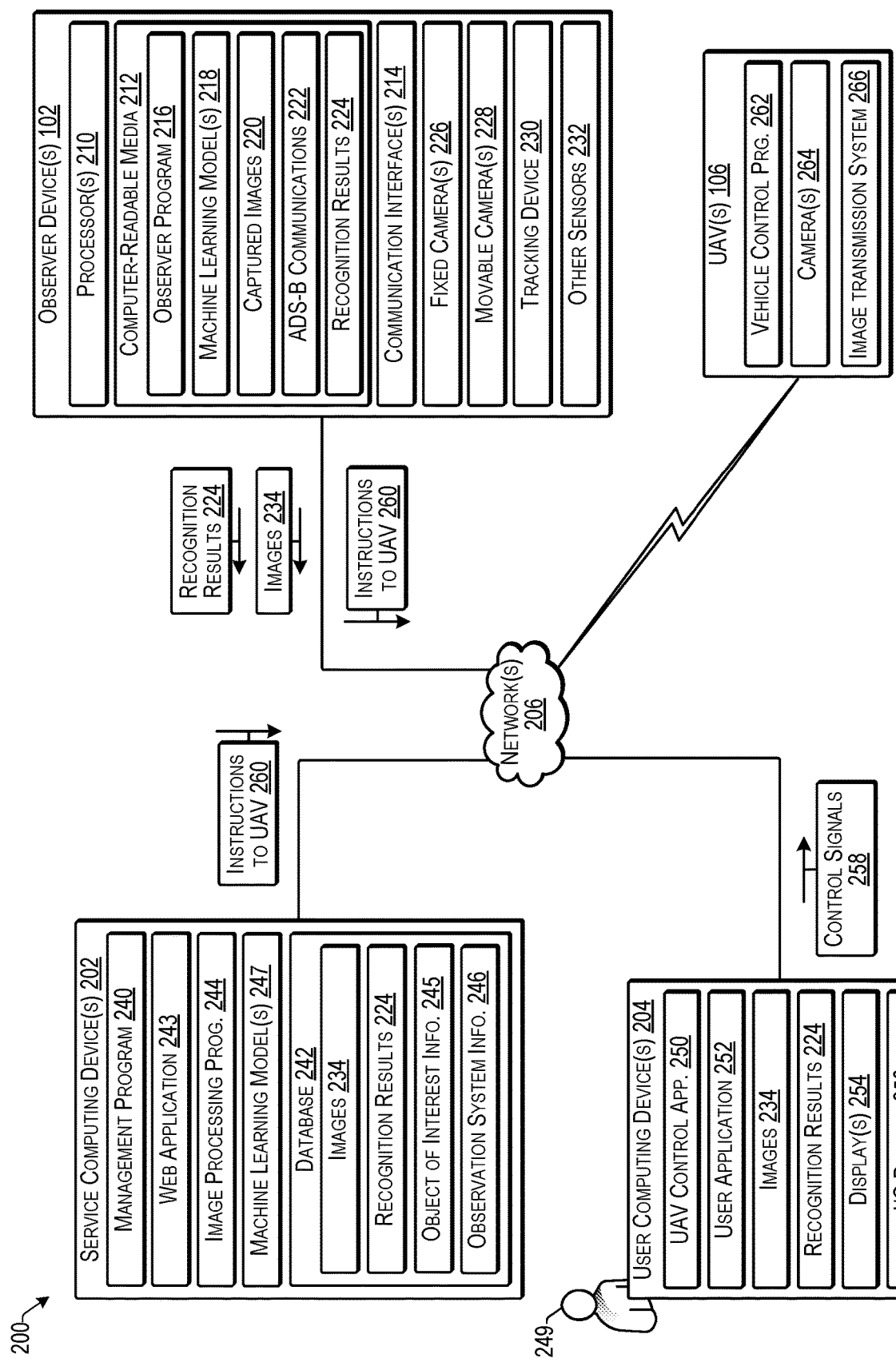
FIG. 2 illustrates an example logical arrangement of a system according to some implementations.

FIG. 2 illustrates an example logical arrangement of a system 200 according to some implementations. In some examples, the system 200 may correspond to the system 100 discussed above with respect to FIG. 1. In the example of FIG. 2, one or more observer devices 102 are able to communicate with a service computing device 202, a user computing device 204, and/or the UAV(s) 106 over one or more networks 206. Further, in the case that there are multiple observer devices 102, the observer devices 102 may be able to communicate with each other over the one or more networks 206.

The one or more networks 206 can include any appropriate network or other communication technology, including a wide area network (WAN), such as the Internet; a local area network (LAN), such an intranet; a wireless network, such as a cellular network or other radio communications; a local wireless network, such as Wi-Fi; close-range wireless communications, such as BLUETOOTH®; a wired network, including fiber optics and Ethernet; any combination thereof, or any other suitable communication network or other communication technology.

Components used for such communication technologies can depend at least in part upon the type of network, the environment of use, or both. For example, wireless communications may use any of a plurality of communications standards, protocols and technologies, including, but not limited to, Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLUETOOTH®, Wireless Fidelity (Wi-Fi) (e.g., IEEE 802.11n and/or IEEE 802.11ac), Wi-MAX, ADS-B, or any other suitable radio or other communication protocols. For example, 900 MHz, 2.4 GHz and 5.8 GHz are the most common radio frequencies used for communicating with UAVs, but implementations herein are not limited to any particular frequency. Accordingly, in the case that one or more of the observer devices 102 are mobile, the mobile observer devices may use a communication technology similar to that used by the UAV 106. Numerous variations will be apparent to those of skill in the art having the benefit of the disclosure herein.

Each observer device 102 may include one or more processors 210, one or more computer readable media 212, and one or more communication interfaces 214. Each processor 210 may be a single processing device or a number of processing devices, and may include single or multiple computing devices and/or multiple processing cores. The processor(s) 210 can be implemented as one or more central processing devices, microprocessors, microcomputers, microcontrollers, digital signal processors, state machines, logic circuitries, and/or any devices that manipulate signals based on operational instructions. As one example, the processor(s) 210 may include one or more hardware processors and/or logic circuits of any suitable type specifically programmed or configured to execute the algorithms and processes described herein. The processor(s) 210 may be configured to fetch and execute computer-readable instructions stored in the computer-readable media 212, which instructions may program the processor(s) 210 to perform the functions described herein.

The computer-readable media 212 may include volatile and nonvolatile memory and/or removable and non-removable media implemented in any type of technology for storage of information, such as computer-readable instructions, data structures, program modules, or other data. For example, the computer-readable media 212 may include, but is not limited to, RAM, ROM, EEPROM, flash memory or other memory technology, optical storage, solid state storage, magnetic disk storage, network attached storage, cloud storage, or any other medium that can be used to store the desired information and that can be accessed by the processor(s) 210. Depending on the configuration, the computer-readable media 212 may be a tangible non-transitory medium to the extent that, when mentioned, non-transitory computer-readable media exclude media such as energy, carrier signals, electromagnetic waves, and/or signals per se.

The computer-readable media 212 may be used to store any number of functional components that are executable by the processor(s) 210. In many implementations, these functional components comprise instructions or programs that are executable by the processor(s) 210 and that, when executed, specifically program the processor(s) 210 to perform the actions attributed herein to the observer device(s) 102. Functional components stored in the computer-readable media 212 may include an observer program 216 and one or more machine learning models 218. For example, the observer program 216 may be executed for receiving captured images 220 and ADS-B communications 222, and based on this received information, detecting and recognizing objects of interest that may be in, or likely to enter, the airspace of a designated volume.

In addition, the computer-readable media 212 may store data and data structures used for performing the operations described herein. For example, the computer-readable media 212 may store, at least temporarily, captured images 220, received ADS-B communications 224, and any recognition results 224 determined by the observer program 216. The observer device 102 may also include or maintain other functional components and data not specifically shown in FIG. 2, such as other programs and data, which may include applications, drivers, and other logical, programmatic, and physical components, of which those described herein are merely examples that are related to the discussion.

The one or more communication interfaces 214 may include one or more software and hardware components for enabling communication with various other devices, such as the UAV(s) 106, the service computing device(s) 202, the user computing device 204, and/or other observer devices 102. For example, the communication interface(s) 214 may enable communication through one or more of a LAN, the Internet, cable networks, cellular networks, wireless networks (e.g., Wi-Fi and other radio) and wired networks (e.g., fiber optic, Ethernet, Fibre Channel), direct connections, as well as close-range communications such as BLUETOOTH®, and the like.

In some implementations, the communication interface(s) 214 may include radiofrequency (RF) circuitry (not shown in FIG. 2). Thus, the transmission and reception of electromagnetic communications signals may be carried out wirelessly, for example, via an RF transceiver as one example of the communication interfaces 214. In such implementations, RF circuitry may convert electrical signals to/from electromagnetic signals and communicate with communications networks and other communications devices via the electromagnetic signals. The RF circuitry may include known circuitry for performing these functions, including, but not limited to, an antenna, an RF transceiver, one or more amplifiers, a tuner, one or more oscillators, a digital signal processor, a CODEC chipset, a subscriber identity module (SIM) card, memory, and so forth. The RF circuitry may facilitate transmission and reception of data over communications networks (including public, private, local, and wide area). As mentioned above, 900 MHz, 2.4 GHz, and 5.8 GHz are common radio frequencies used for communicating with UAVs, but implementations herein are not limited to any particular frequency. In some cases, the communication interface(s) 214 may include an ADS-B-in receiver (and/or other type of aviation information receiver, interrogator, etc.). In other cases, the observer devices may receive ADS-B-in communications over the one or more networks 206 from an ADS-B-in receiver that is separate from the observer device 102. Other types of aviation transponder or interrogation information may be similarly received over the one or more networks.

The observer device 102 may also include one or more fixed cameras 226 and one or more movable cameras 228. Each camera 226, 228 may include one or more optical sensors for capturing images of surroundings of the observer device 102 (including still images and/or video). For instance, the cameras 226, 228 may include high resolution image sensors (e.g., 4K or higher) for capturing images that may be analyzed at full resolution at the observer device 102. Further, in some examples, the movable camera 228 may include a fixed focal length telephoto lens for enabling the movable camera 228 to capture magnified images of a region of interest for obtaining higher-detail images of any object in the region of interest. Alternatively, in other examples, the movable camera 228 may include a motorized and remotely controllable telephoto optical zoom lens having an adjustable focal length, rather than a fixed focal length telephoto lens.

A tracking device 230 may include one or more devices to adjust an orientation and/or position of the movable camera 228. For instance, the tracking device 230 may be controlled for pointing the field of view of the movable camera 228 at a region of interest and for moving the movable camera relative to the body of the observer device 102 to track any object detected in the field of view of the movable camera 228. In some examples, the tracking device 230 may include a motorized mechanical gimbal or a hybrid digital-mechanical gimbal. In addition, while tracking an object, the tracking device 230 may adjust an orientation of the movable camera 228, such as to keep a tracked object approximately centered in the field of view of the movable camera 228.

Additionally, the observer device 102 may include one or more other sensors 232, such as radar, lidar, a microphone, thermal sensors, or the like. For instance, radar data may be used to verify recognition results determined based on captured images or, alternatively, captured images may be used to verify radar data. In addition, a microphone may be used to detect the sound of an approaching aircraft and so forth.

In some cases, the service computing device(s) 202 may be located at or near the designated area at which the observer devices 102 are located. Alternatively, the service computing device(s) 202 may be located remotely from the designated area, such as at a cloud computing location, data center, server farm, or the like. The service computing device 202 may include a management program 240 that may be executed to communicate with the observer devices 102 such as for receiving images 234 and/or recognition results 224. In some cases, the images 234 sent to the service computing device 202 may be lower resolution and/or only a portion of the images captured by the observer device 102, which can reduce the amount of network bandwidth consumed by each observer device 102. For instance, the images 234 may include images that correspond to the recognition results 224 such as images that include a recognized object or the like.

The management program 240 may store the received images and recognition results in a database 242. In addition, the management program 240 may perform other functions for managing the observer devices 102 such as for monitoring each observer device 102 to ensure proper function and communication capabilities. In addition, the service computing device 202 may include a web application 243 that may enable a user 249 associated with the user computing device 204 to access the database 242 and/or other information about the observer devices 102 or observation system 100.

In addition, the service computing device(s) 202 may include an image processing program 244 in some examples herein for performing recognition and other image processing. For instance, rather than one of the observer devices 102 performing image processing and recognition on the images received from a plurality of the observer devices 102, the image processing program 244 on the service computing device(s) 202 may perform this function. As discussed additionally below, in some cases, the image processing program 244 may employ one or more machine learning models 247 for performing the recognition and/or other image processing. For instance, a convolutional neural network (CNN) or other machine learning classifier may be used for recognizing a candidate object as an object of interest or not an object of interest. Accordingly, the image processing program 244 may make a determination of object of interest information 245, which in some cases, may identify the type of aircraft or other object detected, a trajectory of the object, a velocity of the object, whether the UAV(s) 106 should perform an action, and so forth. Several example algorithms are discussed additionally below.

Alternatively, in some examples, the UAV(s) 106 may perform the recognition and other image processing onboard the UAV(s) 106, such as during flight. In such a case, one UAV 106, some, or all of the UAVs 106 may include the image processing program 244 and the machine learning model(s) 247. For example, the UAV 106 may receive images from the movable cameras 228 of the observer devices 102 and may perform the recognition and other image processing, such as for determining that the candidate object is an object of interest, and further for determining a trajectory and velocity of the object of interest. Based on this determination, the UAV 106 may determine to perform an action in response to the object of interest entering the designated volume, such as landing autonomously, moving to a different location, changing a planned flight path, or the like. Further, the UAV 106 may send a notification to the user computing device 204 to notify the user of the object of interest and/or the action being performed by the UAV 106. The UAV 106 may also send recognition results 224 to the service computing device(s) 202 for storage in the database 242. Alternatively, the UAV 110 that includes an observer device 102 may perform the recognition and other image processing functions discussed above, rather than the UAV 106.

Furthermore, the database 242 may maintain observation system information 246, which may include configuration information about the observation system, such as locations and capabilities of the ground-based observer devices and information about any mobile observer devices. Additionally, the observation system information 246 may include calibration information for calibrating the observation system. For example, to calibrate the system, such as following initial installation or for a temporary installation, the location of each observer device 102 relative to the other may be initially established such as based on satellite positioning information or the like. A more precise determination of the position and attitude of the respective cameras of the respective observer devices 102 relative to the respective cameras of others of the respective observer devices 102 may be determined by comparison of images that include the same objects such as a mountain top, building, tree, stars, sun, moon, UAV, manned aircraft, landmark, or the like. The calibration of the observer devices 102 may establish the relative points of view between cameras of the multiple observer devices 102, such as to enable accurate parallax calculations for images captured by multiple different observer device cameras from different points of view of the same object that may be entering or near the airspace of the designated area.

In some implementations, the user computing device(s) 202 may be located at or near the designated area at which the observer devices 102 are located. Alternatively, the user computing device(s) 202 may be located remotely from the designated area. Further, in the case that the UAV 106 is operated manually by the user 249, the user computing device(s) 102 may include at least a UAV control application 250 that may be executed to enable the user 249 to remotely control the UAV 106. Similarly, in some cases, the UAV 110 (not shown in FIG. 2) that may include an onboard observer device 102 may also be manually controlled by the user 249 or another user (not shown). Alternatively, in other implementations, the UAV(s) 106 and/or 110 may be configured to operate generally autonomously, with the user 249 taking over manual control when an abnormal situation occurs or the like.

The user computing device 204 may further include a user application 252 that may be used in some examples to access the web application 243 at the service computing device 202, such as for accessing the database 242 and/or interacting with the management program 240 for managing the observer devices 102 and/or the configuration of the observation system 200. Alternatively, in other examples, the user application 252 may be used for managing the observer devices 102 directly via the user computing device 204.

Furthermore, the user computing device may include one or more displays 254 that may present images 234 and/or recognition results 224 received from the observer devices 102 such as for presenting real-time video of any detected objects that may enter the airspace of the designated area and/or real time video of the UAV 106 as the UAV 106 is in flight. For example, the observer devices 102 may present a third person perspective of the UAV 106 during operation. Accordingly, the observer devices 102 may send video feeds from their cameras to the user computing device 204, and the video feeds may be presented on the display(s) 254 to enable the user 249 to act as a remote visual observer of the UAV 106. For example, the user 249 may also use the video feeds to observe the airspace surrounding the UAV 106 in addition to maintaining a direct view of the UAV 106. In addition, in some examples, if the recognition results are uncertain as to whether a detected object is an object of interest, the corresponding images 234 and recognition results 224 may be sent to the user computing device 204 to enable the user 249 to make a determination based on the received images 234 and recognition results 224.

In addition, the user computing device 204 may include one or more input/output (I/O) devices 256 that may be used for interacting with the user computing device 204 and/or that may be used for controlling the UAVs 106 and/or 110. In addition, the I/O devices 206 may also be used for controlling the movable cameras 228 at the respective observer devices 102. Examples of I/O devices may include keyboard, mouse, joysticks, control buttons, or the like which may cause the user computing device 204 to send one or more control signals 258 to a selected observer device 102, or to a UAV 106 or 110. For example, the user 249 may use the I/O devices 206 to remotely assume control of the movable camera 228 of a selected observer device 102 to point the movable camera in a desired direction, control the zoom level of the movable camera, and so forth. Furthermore, while a single user 249 is illustrated in FIG. 2, in other examples, there may be a plurality of users 249, such as a respective user 249 for each UAV 106 that is in operation. Additionally, in other examples, there might not be any user 249, and the system 200 may operate autonomously without human intervention.

In some examples, the UAV 106 may include a vehicle control program 262 that may be executed onboard the UAV 106 such as for enabling the UAV 106 to perform one or more tasks autonomously, semi-autonomously, or under the control of the user 249. Further, the UAV 106 may include one or more cameras 264, and an image transmission system 266 for transmitting images back to the user computing device and/or to the service computing device(s), depending on the intended purpose for operating the UAV 106. The UAV 110 may include similar hardware and software components. Additional details of the UAVs 106, 110 are discussed below, e.g., with respect to FIG. 10.

In some examples, each of the observer devices 102 may continually scan at least a portion of the designated volume such as when one or more UAVs 106 are in operation. The observer program 216 may be executed to control the operation of the cameras 226, 228, as well as any other onboard sensors (e.g., radar, lidar, microphone) and may further maintain communications with the UAV(s) 106, such as in the case that an object of interest is identified by the observer program 216 and it is desired to send instructions 260 to the UAV 106. As one example, if an aircraft or other object of interest is detected to be entering the designated volume, the observer device 102 may send an instruction 260 to the UAV 106 to land or take other action. Further, in the case that the service computing device 202 (or other computing device) performs the recognition and other image processing, the service computing device 202 (or other computing device) may send the instructions 260 to the UAV(s) 106.

In addition, the observer program 216 may communicate with the user computing device(s) 204, such as for providing the recognition results 224 and/or images 234 of an object of interest, or a candidate object of interest, to the user computing device(s) 204. For instance, the observer devices 102 may provide real-time video feed from the cameras 226, 228 to the user computing device(s) 204. Further, the observer devices 102 may provide recognition results to the user computing device 204 such as for alerting the user 249 of an object of interest entering the designated volume or the like.

In addition, the observer device 102 may be configured by the observer program 216 to transmit images 234, such as still images or captured video, in real time to other observer device(s) 102. For instance, in some cases, the observer device 102 may transmit the images 234 at a lower resolution to reduce the load on the network(s) 206. In other examples, such as in the case of sharing images with another observer device 102 for performing recognition and parallax calculations, the images 234 may be transmitted at full resolution to enable higher quality recognition. As one example, one of the observer devices 102 may be elected as a leader device for receiving the images 234 from other observer devices 102 for performing recognition processing to attempt to recognize an object of interest from the images that it captured and from images received from other ones of the observation devices 102. The system may use any suitable technique for selecting one of the observer devices to perform the recognition calculations using images received from others of the observer devices 102. Furthermore, in some examples, one of the observer devices 102 may be provided with a higher capacity processor, memory, and storage capability for performing the recognition processing on behalf of other ones of the observer devices 102.

Alternatively, the service computing device 202 or the user computing device 204 may perform at least a portion of the image recognition instead of the observer devices 102 performing it locally at the observer devices 102. For example, multiple observer devices 102 may aim their movable cameras 228 at the candidate object and may send the video feeds from the movable cameras to the service computing device(s) 202. The service computing device(s) 202 may execute the image processing program 244 to perform recognition and other image processing on the candidate object to determine whether the candidate object is an object of interest, and if so, the trajectory of the object, the velocity of the object, and so forth. For instance based on comparing images taken concurrently (e.g., close in time to each other) from a first observer device and a second observer device having known location, the service computing device(s) 202 may determine the distance to the object, and based on changes in received images detected over time may determine the speed and trajectory of the object, as well as recognizing the object. In the case that the service computing device(s) 202 determines that the object is an object of interest that will enter the designated volume, the service computing device may send an alert to the user computing device 204 and/or may send an instruction to the UAV 106 to perform an action.

In some cases, these operations may be performed by the service computing device(s) 202, while in other examples, these operations may be performed by the user computing device 204, by one or more of the observer devices 102, or by a processor onboard the UAV 106. Additionally, in some examples, the service computing device 202 and the user computing device 204 may be the same computing device, which may be configured to perform all the functions discussed above with respect to the service computing device(s) 202 and the user computing device(s) 204. As another example, the above described functions may be distributed differently between the user computing device(s) 204, the service computing device(s) 202, the observer devices 102, and/or the UAV 106. Numerous other variations will be apparent to those of skill in the art having the benefit of the disclosure herein.

Figure 3:
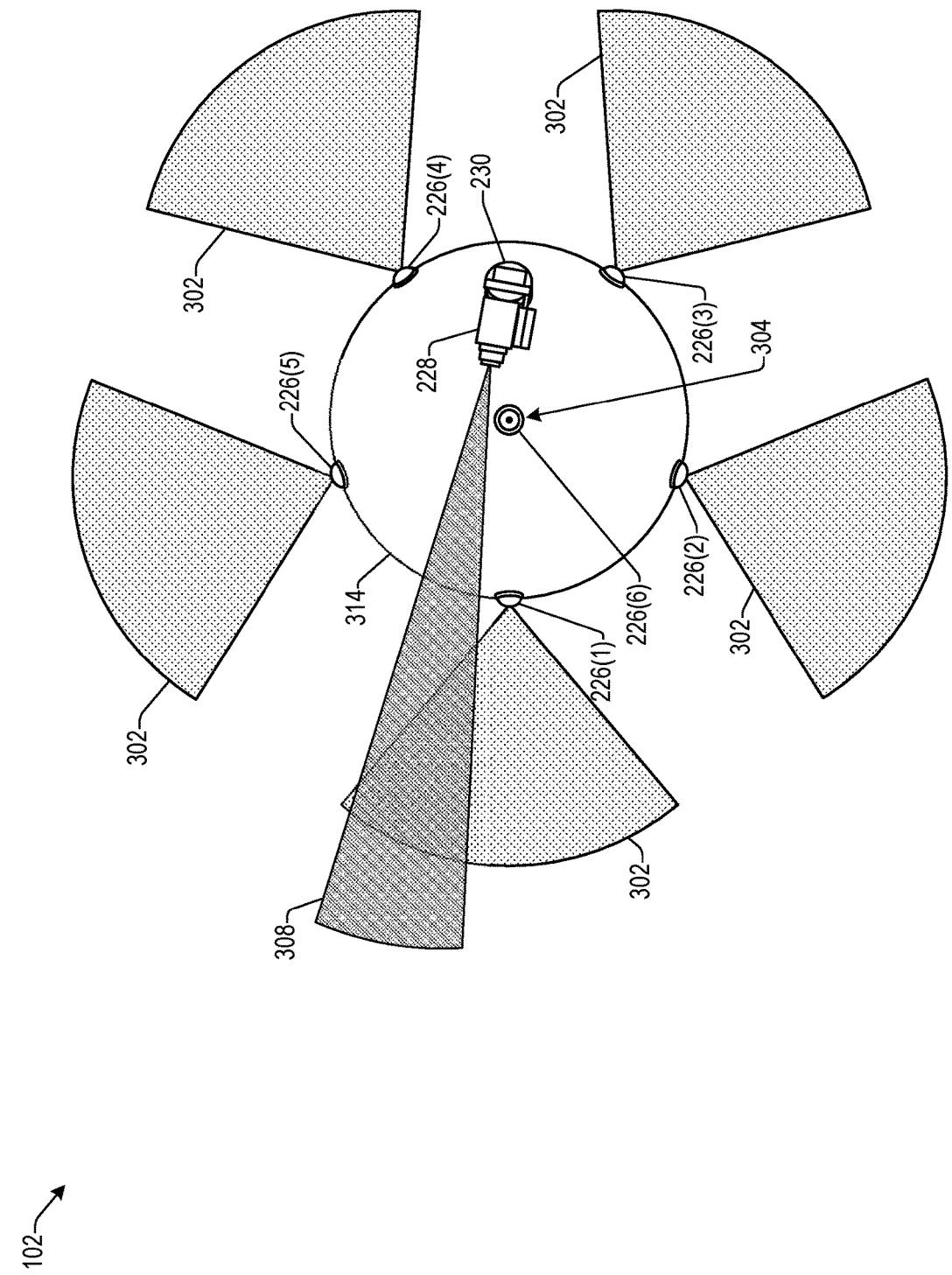
FIG. 3 illustrates a top view of an example observer device according to some implementations.

FIG. 3 illustrates a top view of an example observer device 102 according to some implementations. In this example, the observer device 102 includes five radially arranged fixed cameras 226(1)-226(5), each having a sufficiently wide field of view 302 to provide a combined 360 degree field of view around a central axis 304 of the observer device 102. For instance, the fields of view 302 of the radially arranged fixed cameras 226(1)-226(5) may be between 73 and 90 degrees, or larger in some cases. In addition, the observer device 102 includes an upward facing fixed camera 226(6) located at a central axis 304 of the observer device 102 having a field of view facing upward (not shown in FIG. 3 for clarity of illustration).

As one example, the field of view of the upward facing fixed camera 226(6) may be hemispherical, e.g., covering 360 degrees around the observer device 102 when the observer device 102 is viewed from above and covering 180 degrees above the observer device 102 when viewed from the side. Accordingly, the field of view of the upward facing fixed camera 226(6) overlaps with the fields of view 302 of the five radially positioned fixed cameras 226(1)-226(5) to provide the observer device 102 with a composite high resolution field of view of its surroundings that is greater than hemispherical in coverage. Further, while the example of FIGS. 3 and 4 provides a greater-than-hemispherical composite field of view to the observer device 102, the field of view in other examples may be more (e.g., all the way up to a spherical field of view) or less that hemispherical in some cases. For example, in the case of a spherical field of view, the observer device 102 may also monitor for ground collision risk for the UAV 106 (e.g., the possibility of collision with people, vehicles, etc., in addition to air collision risk.

In addition, the observer device 102 includes the movable camera 228 that is mounted on the tracking device 230, such as a motorized gimbal. For instance, the movable camera 228 may be positionable by the observer program 216 executing on the observer device 102 to control the tracking device 230 to point the movable camera 228 at a determined region of interest. Additionally, or alternatively, the movable camera 228 may be positionable by remote operation performed by the user 249 mentioned above for manually focusing the movable camera 228 on a suspected candidate object detected initially using one or more of the fixed cameras 226(1)-226(6). The movable camera 228 may have a more focused, zoomable, telephoto field of view 308, and may be capable of zooming in on a suspected or identified object to obtain a magnified view of the object. The observer program 216 and/or the user may control the tracking device 230 to cause the movable camera 228 to track and capture images of the detected object as the object moves.

In this example, the observer device 102 has a generally dome-shaped housing 314. The electronics hardware, such as the processor(s) 210, computer readable media 212, communication interfaces 214, and other sensors 232 (not shown in FIG. 3) discussed above with respect to FIG. 2 may be included within the housing 314. Further, the observer device 102 is not limited to any particular housing configuration and may include a spherical housing, hemispherical housing, polygonal housing, geodesic housing, star-shaped housing, or any other desired housing shape or arrangement.

In addition, while five radially arranged fixed cameras 226(1)-226(5) and one upward-facing fixed camera 226(6) are included in this example, more or fewer fixed cameras 226 with different arrangements, positions, configurations, fields of view, etc., may be used in other examples. Further, while a single movable camera 228 is shown in this example, more or fewer movable cameras 228 may be used in other examples. For instance, some observer devices 102 may have no movable camera 228. Additionally, or alternatively, some observer devices 102 may have multiple movable cameras 228, such as to enable tracking of multiple objects concurrently. Additionally, some observer devices 102 may have multiple cameras 228 or one or more other sensors affixed to the same tracking device 230, such as to provide different zoom levels, different wavelength sensitivity, or other types of information. For instance, in some cases, a lidar sensor, thermal camera, or other type of sensor (all not shown in FIG. 3), may be mounted on the tracking device 230.

Figure 4:
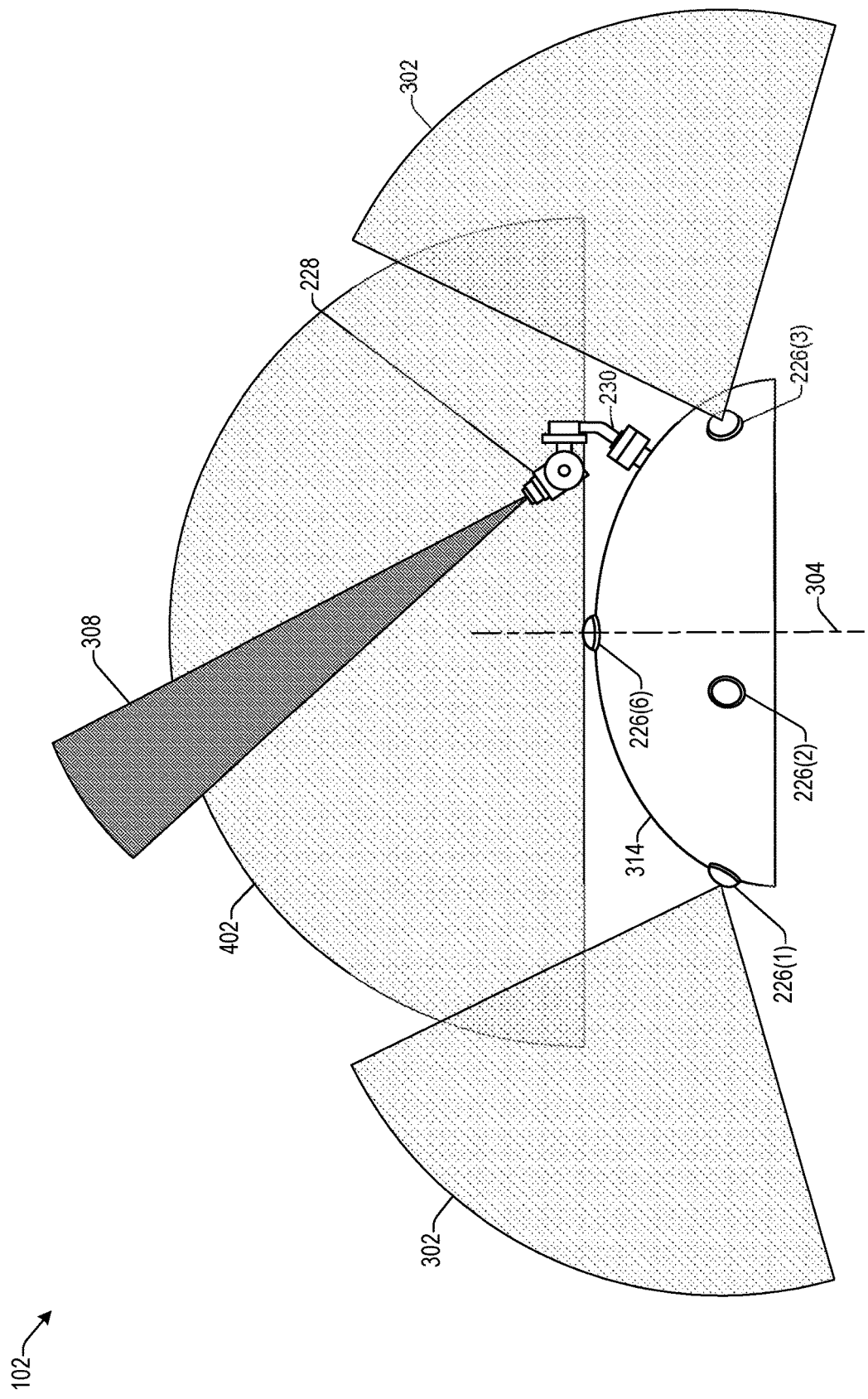
FIG. 4 illustrates a side view of an example observer device according to some implementations.

FIG. 4 illustrates a side view of an example observer device 102 according to some implementations. For instance, this view shows a side view of the hemispherical field of view 402 of the upward-facing fixed camera 226(6), showing that the field of view 402 covers 180 degrees above the observer device 102. FIG. 4 also illustrates a side view of the fields of view 302 of the respective fixed cameras 226(1) and 226(3). The field of view of the fixed camera 226(2) is omitted from FIG. 4 for clarity of illustration.

In some examples, the movable camera 228 may be positioned in any desired direction such as for focusing on, zooming in on, and/or tracking a candidate object. As one example, the tracking device 230 associated with the movable camera 228 may include a two-axis or three-axis motorized gimbal able to pan greater than 360 degrees and tilt between at least −15 degrees and 90 degrees (e.g., below horizontal to vertical relative to a plane perpendicular to the central axis 304). The movable camera 228 and tracking device may be located between the fields of view of two of the radially arranged fixed cameras. Further, while the moveable camera 228 may partially obscure the field of view of the upward facing fixed camera 226(6), this is compensated for by the fields of view of the two radially arranged fixed cameras between which the movable camera 228 is disposed, i.e., cameras 226(3) and 226(4) in FIG. 3.

Additionally, in some examples, an observer device 102 mounted on a UAV 110, as discussed above with respect to FIG. 1, may have smaller, lighter, and/or lower-resolution cameras than a typical ground-based observer device 102. Furthermore, while one possible example of a suitable camera arrangement for the observer devices 102 is described and illustrated with respect to FIGS. 3 and 4, numerous other variations will be apparent to those of skill in the art having the benefit of the disclosure herein. Accordingly, implementations herein are not limited to any particular arrangement of cameras, types of cameras, or housing configuration for the observer devices 102.

Figure 5:
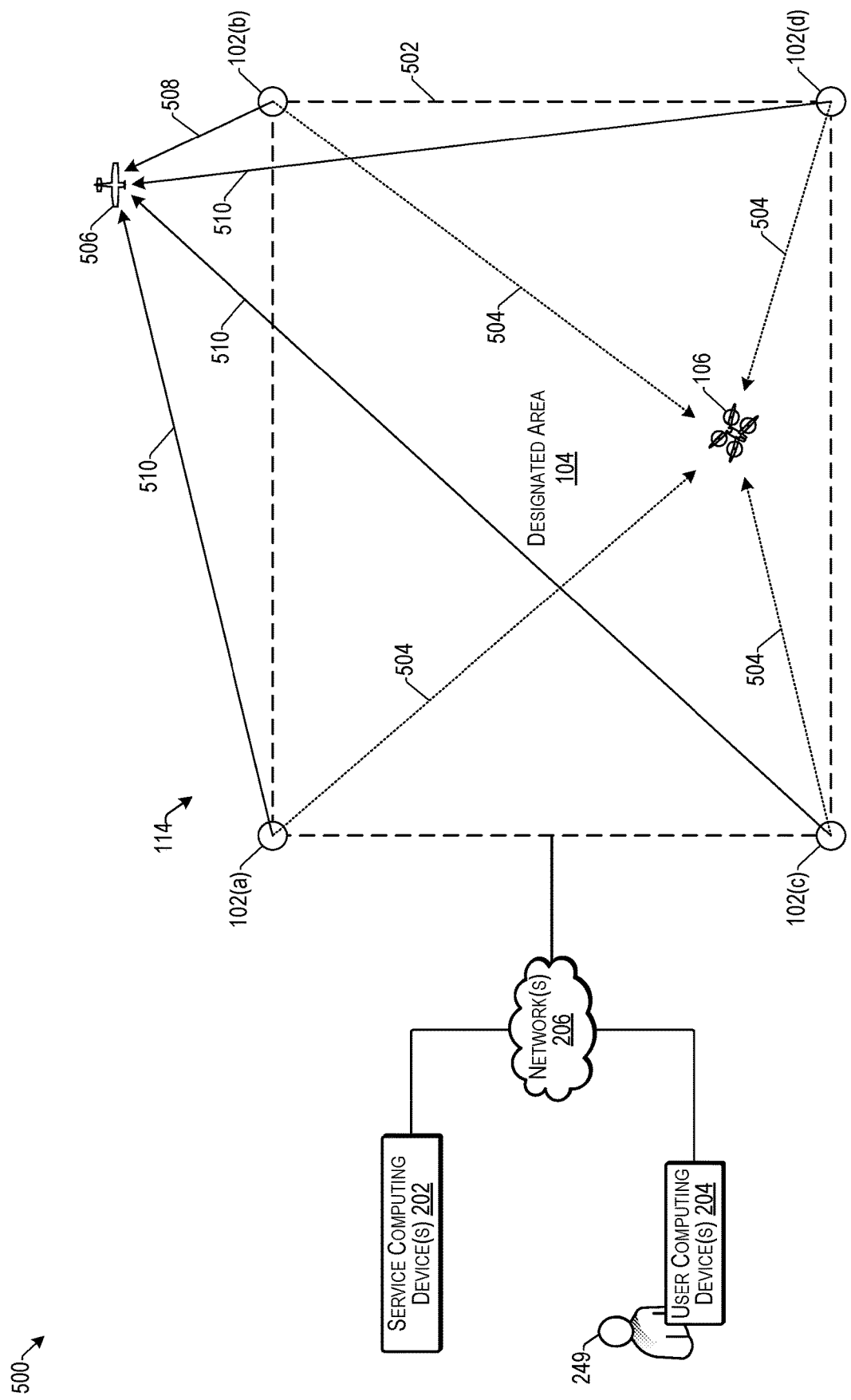
FIG. 5 illustrates an example of observer devices communicating with each other for detecting an object of interest according to some implementations.

FIG. 5 illustrates an example 500 of observer devices 102 communicating with each other for detecting an object of interest according to some implementations. FIG. 5 shows a plan view (not to scale) of a designated area 104. FIG. 5 further includes four observer devices 102(*a*), 102(*b*), 102 (*c*), and 102(*d*) that are disposed along a perimeter 502 of the designated area 104. While the observer devices 102 are disposed at the perimeter 502 of the designated area 104 in this example, in other examples, the observer devices 102 may be disposed inside and/or outside the designated area 104 at strategic locations to enable a view of the airspace surrounding the designated area. In addition, in some cases, the observer devices 102 may be positioned around or within the designated area 104 so that at least one observer device 102 is able to maintain a view of any UAVs 106 operating within the designated area 104 at all times, such as indicated by arrows 504.

Further, in the case that multiple observer devices 102 have a view of the UAV 106, the observer devices 102 may be able to provide an accurate location of the UAV within the designated area, obviating the need for the UAV to include an onboard satellite positioning receiver. For example, as discussed above, following installation, the cameras of the observer devices 102 may be calibrated with respect to the cameras of the other observer devices 102, such as based on different points of view of one or more distant objects. Following the calibration of the observer devices 102, stereo imaging parallax calculations may be used to determine, for a UAV 106 within a field of view of two or more of the observer devices 102, a distance of the UAV 106 from the respective observer devices 102. Based on this distance determination and the known locations of the observer devices 102, the observer devices 102 may continually send to the UAV 106 and/or the user computing device 204 information about the location of the UAV 106 within the designated area. This technique may enable the UAV 106 to operate in an area without GPS access and or in situations in which the UAV 106 is constructed without a GPS receiver.

In some examples, the airspace over the designated area 104 may include the designated volume 114. In other examples, the designated volume 114 corresponding to the designated area 104 may extend beyond the designated area 104 or may be contained within the perimeter 502 of the designated area 104.

In the illustrated example, the observer devices 102(*a*)-102(*d*) may be ground-based observer devices, mobile observer devices, or a combination thereof. In any event, the observer devices 102(*a*)-102(*d*) may be able to communicate with the service computing device(s) 202 and the user computing device 204 through the one or more networks 206.

As one example, suppose that an object 506, such as an aircraft, is approaching the designated volume 114 and is initially detected by the observer device 102(*b*) as a moving speck based on images captured by one or more fixed cameras 126 (not shown in FIG. 5) of the observer device 102(*b*). The observer device 102(*b*) may perform one or more recognition operations using the images captured by the fixed camera to determine that the moving speck is likely a candidate object. Based on this determination, the observer device 102(*b*) may control the tracking device 230 to point its movable camera 228 (not shown in FIG. 5) at the object 506, as indicated by arrow 508, to begin capturing magnified images of the object 506. In addition, the observer device 102 may communicate with the other observer devices 102(*a*), 102(*c*), and 102(*d*) to notify the other observer devices of the location of the object 506. In response, the observer devices 1102(*a*), 102(*c*), and 102(*d*) may control their own tracking devices to also point their own movable cameras 228 at the object 506, as indicated by arrows 510.

In some examples, the images captured by the movable cameras 228 at the observer devices 102(*a*)-102(*d*) may be sent to the service computing device(s) 202 for recognition and other image processing using the magnified images captured from multiple points of view. Alternatively, in other examples, one of the observer devices 102(*a*)-102(*d*) may receive the images captured by the other observer devices' movable cameras and may perform the recognition and other image processing. As still another alternative, the recognition and other image processing may be performed on the user computing device 204. As yet another alternative, the UAV 106 may receive the captured images wirelessly from the observer devices 102(*a*)-102(*d*), and may perform the recognition and other image processing onboard the UAV 106.

As one example, the recognition processing may include using a computer vision algorithm, which may include a trained convolutional neural network (CNN) or other trained machine learning classifier in some examples, to determine whether the object 506 is an object of interest, and if so, the system may perform at least one action such as notifying the user 249 and/or sending an instruction to the UAV 106 to cause the UAV 106 to land, move to a different location, change a planned flight path, or perform some other action. For example, the machine learning classifier may be trained using a first data set of images of airborne objects. One or more second data sets may be used to test the trained model and tune the model parameters to achieve an accurate model.

In addition, as an alternative example, the observer devices 102(*a*)-102(*d*) may include additional fixed cameras that may include a view of the ground near to the respective observer devices 102(*a*)-102(*d*). For example, suppose that one of the observer devices, such as 102(*a*), recognizes motion, such as a person, at the perimeter of the designated area. The observer device 102(*a*) may aim its movable camera at the person, and upon confirmation of the recognition, may send an instruction to one or more UAVs 106 to fly to the location to investigate the perimeter breach, or alternatively, may notify the user 249, who may pilot a UAV to the location.

Figure 6:
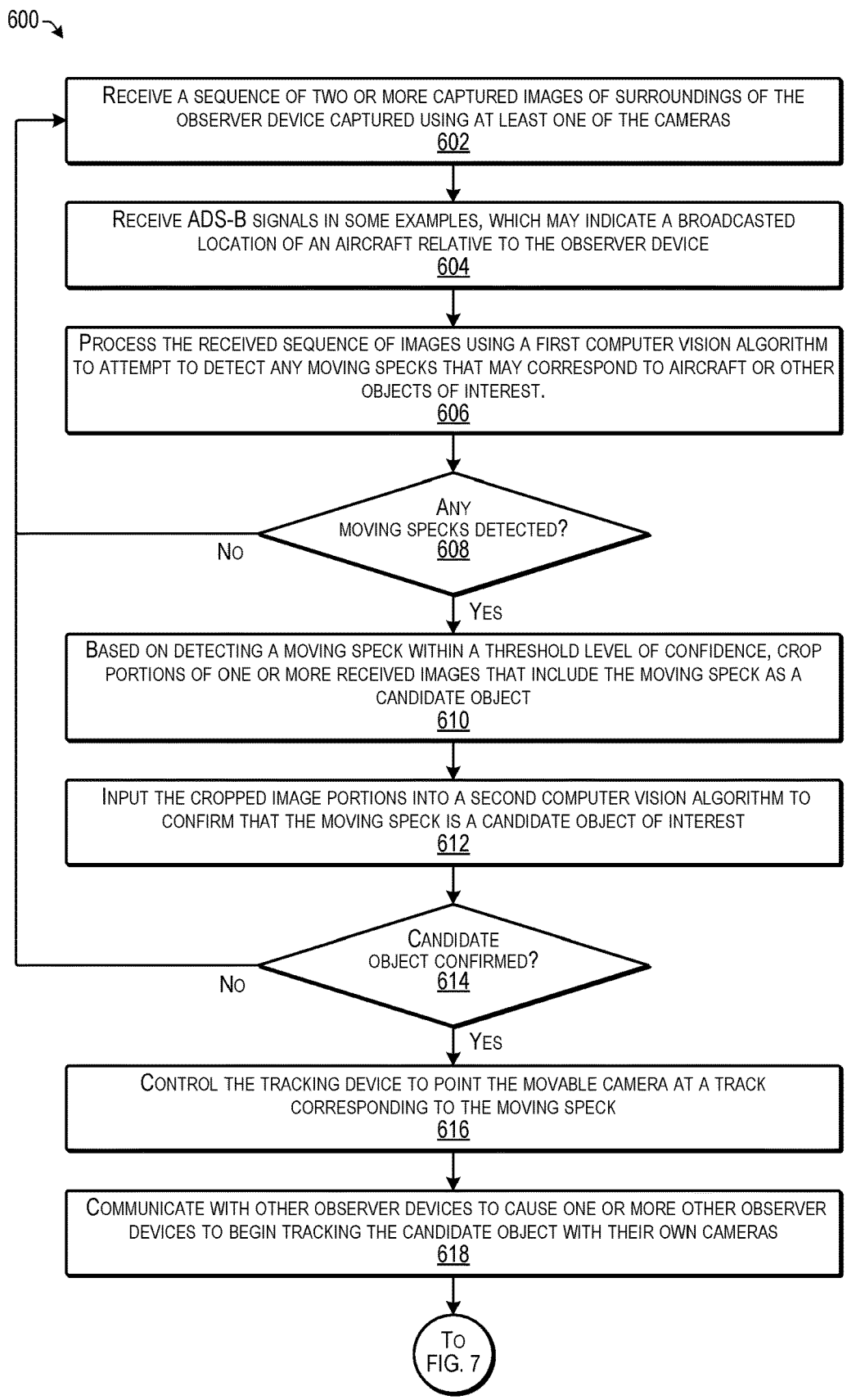
FIG. 6 is a flow diagram illustrating an example process for detecting an object of interest according to some implementations.
Figure 7:
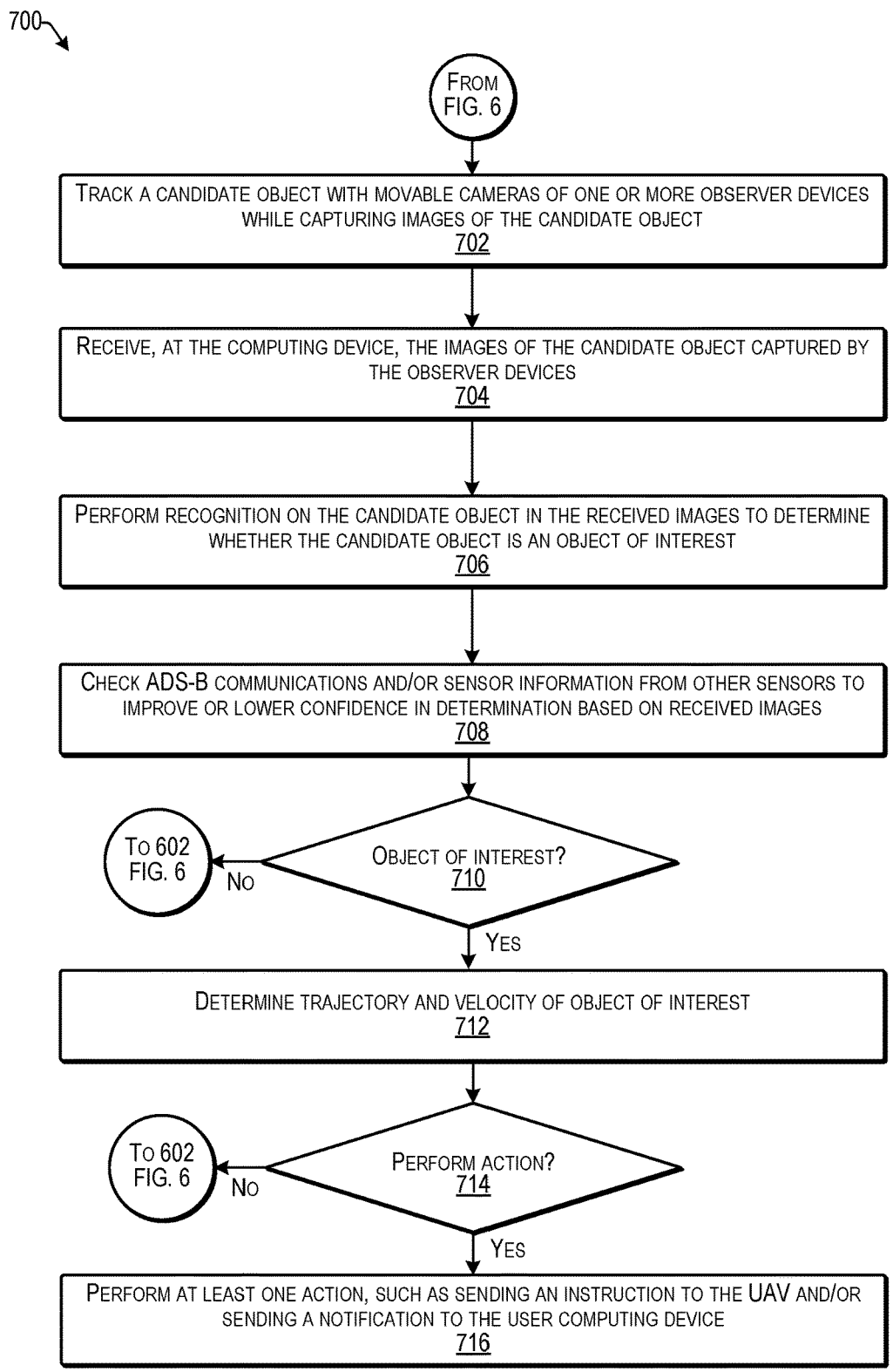
FIG. 7 is a flow diagram illustrating an example process that may be a continuation of the process of FIG. 6 according to some implementations.

FIGS. 6 and 7 include flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems, and devices described in the examples herein, although the processes may be implemented in a wide variety of other environments, systems, and devices.

FIG. 6 is a flow diagram illustrating an example process 600 for detecting an object of interest according to some implementations. In some examples, the process 600 may be executed at least partially by at least one observer device 102 executing the observer program, or may be executed in part by at least one observer device 102 and in part by the service computing device(s) 202 and/or the user computing device(s) 204.

At 602, the observer device 102 may receive a sequence of two or more captured images of surroundings of the observer device 102 captured using at least one of the cameras 226. For instance, the fixed cameras 226 may continually capture high resolution images of the surroundings of the observer device 102. The images may be stored at least temporarily in a memory onboard the observer device 102 for performing recognition image processing on the received images.

At 604, the observer device 102 may receive ADS-B signals in some cases which may indicate a broadcasted location of an aircraft relative to the observer device 102 to indicate a possible area of interest in images from at least one fixed camera of the observer device 102.

At 606, the observer device 102 may process the received sequence of images to attempt to detect any moving specks that may correspond to aircraft or other objects of interest. As one example, the observer device 102 may use a first computer vision algorithm, such as to compare newly received images to an existing background model determined from earlier images from the same camera(s) to attempt to detect any new objects of interest that may be present in the newly received images. Several examples of a suitable first computer vision algorithm may include a probabilistic distribution model, a clustering model, a statistical model, or other machine learning model able to be used for performing fast and efficient detection of candidate objects. For instance, the model may be trained using a training set of images, at least some of which may have moving specks that are representative of aircraft or other objects of interest. Thus, the first computer vision algorithm may be used to quickly distinguish a candidate object from the background of an image. Further, in the case that ADS-B information has been received, the observer device 102 may check an area of a received image that corresponds to the location of aircraft indicated in the ADS-B broadcast.

At 608, the observer device 102 may determine whether a moving speck is detected. For instance, the moving speck may be recognized as being detected if a threshold level of confidence of the results of the first computer vision algorithm supports the finding of a moving speck. If so, the process goes to 608. If not, the process returns to 602 to receive the next image(s) for processing.

At 610, if a moving speck is detected within a threshold level of confidence, the observer device 102 may crop portions of one or more received images that include the moving speck as a candidate object.

At 612, the observer device 102 may input the cropped image portions into a second computer vision algorithm to confirm that the moving speck is a candidate object of interest. For instance, in some cases, the first computer vision algorithm that performs the initial speck detection may provide a high true positive rate, but may also have a relatively high false positive rate. Accordingly, some examples herein may employ the second computer vision algorithm, which may be more computationally expensive than the first computer vision algorithm, to confirm (or reject) the results of the first computer vision algorithm. As one example, a convolutional neural network (CNN) or other suitable machine learning model may be used by the second computer vision algorithm to distinguish actual moving specks from other things that may cause the first computer vision algorithm to provide a false positive. For instance, the second computer vision algorithm may operate as a binary classifier for the cropped image portions and may receive a sequence of cropped image portions as input. The cropped image portions may be digitally enlarged sections of the respective images that include the candidate object, and which are provided to the second computer vision algorithm. Thus, the second computer vision algorithm may determine whether the first computer vision algorithm provided a false positive, thereby improving the recognition accuracy of the object recognition processes performed by the observer devices. This can help to limit the number of candidate objects detected, and thereby limit the demand for aiming the movable camera 228 at many different regions within a short period of time.

As one example, the first computer vision algorithm may determine whether there is a moving speck based on motion cues, while the second computer vision algorithm may determine whether there is a moving speck based on appearance (single frame) and motion (multi frame). For instance, suppose that an event were to occur where the candidate object enters a frame and appears to become stationary long enough for the first computer vision algorithm to incorporate the candidate object into the background. This may remove the candidate object from a background mask. At this point, the track for the candidate object does not get updated once the candidate object is incorporated into the background. However, implementations herein are still able to check the predicted location in the real image using the second computer vision algorithm (e.g., the CNN or other machine learning classifier) and update the track if the candidate object is found.

At 614, the observer device 102 may determine whether a moving speck is confirmed to be a candidate object by the second computer vision algorithm (e.g., within a second threshold level of confidence). If so, the process goes to 612. If not, the process returns to 602 to receive the next image(s).

At 616, based on the moving speck being confirmed to be a candidate object, the observer device 102 may control the tracking device (e.g., the gimbal) to point the movable camera at a track corresponding to the moving speck. For instance, the observer device 102 may control pan, tilt, and/or zoom of the movable camera to aim the movable camera at the candidate object and zoom in on the candidate object.

At 616, the observer device 102 may communicate with other observer devices 102 to cause one or more other observer devices 102 to begin tracking the candidate object with their own cameras. Additionally, or alternatively, the observer device 102 may send live video or a still image to the user computing device 102 to request user verification that the candidate object is likely an object of interest.

FIG. 7 is a flow diagram illustrating an example process 700 that may be a continuation of the process 600 of FIG. 6 according to some implementations. In some examples, at least a portion of the process 700 may be executed by the observer device 102, such as by executing the observer program. Alternatively, in some examples, at least a portion of the process 700 may be performed by the service computing device(s) 202, the user computing device(s) 204, or by the UAV(s) 106 and/or 110 themselves. Accordingly, the process 700 may be performed by at least one computing device which may be at least one of an observer device 102, the service computing device 202, the user computing device 204, or the UAVs 106, 110.

At 702, a plurality of observer devices 102 may track a candidate object with their movable cameras while capturing images of the candidate object, such as live video. As one example, a Kalman filter and Hungarian algorithm may be employed for motion prediction when tracking the candidate object in case the candidate object is temporarily lost in one or more frames, such as due to occlusion or the like. For example, the tracking may be able to continue based on the last velocity estimates in the event that the image of the object is for several time steps.

At 704, the computing device may receive the images of the candidate object. For instance, the images may be magnified as a result of an optical zoom lens or other telephoto lens system included in the movable cameras. In some cases, the computing device may receive video feeds from multiple movable cameras captured at multiple respective different observer devices 102 at different locations, thereby providing multiple different points of view of the candidate object. As one example, the computing device may be the service computing device(s) 202, which may receive the images of the candidate object over the one or more networks from the plurality of observer devices 102. As another example, the computing device may be one of the observer devices 102 that receives images from its own movable camera and/or receives images from the movable cameras of one or more other observer devices 102. As yet another example, the computing device may be user computing device 204. As yet another alternative, the UAV(s) 106 or 110 may receive the captured images wirelessly from the observer devices 102(a)-102(d), and may perform the recognition and other image processing onboard the UAV 106, 110.

At 706, the computing device may perform recognition on the received images of the candidate object. In some examples, a third computer vision algorithm, such as a CNN or other machine learning classifier, may be used for recognition to determine whether the candidate object is an object of interest or not. As one example, the machine learning classifier may be a binary classifier that determines whether the candidate object is or is not an object of interest (e.g., a manned aircraft or the like). As another example, the machine learning classifier may be trained to distinguish a type of the object more specifically, such as an airplane, helicopter, other manned apparatus, UAV, balloon, bird, etc. In some examples, the third computer vision algorithm may include using a machine learning classifier, such as a trained CNN, but implementations herein are not limited to any particular type of machine learning classifier. In addition, in other examples, conventional image recognition techniques may be employed, rather than a machine learning classifier or other machine learning model.

At 708, the computing device may check for recently received ADS-B communications and/or sensor information from the other sensors, if any, such as for improving or lowering confidence in the determination of whether the candidate object is an object of interest. For instance, if there are one or more ADS-B communications from an aircraft providing a location corresponding to the recognized object of interest then this would increase the confidence that the identified object is indeed an object of interest. Similarly, if radar, lidar, thermal camera, microphone, or other sensor provides an indication that the identified object is an object of interest this may also improve the confidence in the determination that the object is an object of interest. For instance, the radar may indicate that the object is moving in a manner similar to an airplane, helicopter, or the like. Further, the microphone may pick up sounds recognizable as those corresponding to a manned aircraft or the like. The images from the cameras and the sensor information from the other sensors onboard the observer devices may be received from the plurality of observer devices, and may be aggregated to determine an accurate track of the object of interest, as well as to perform recognition of the object of interest.

At 710, the computing device may determine whether the object is an object of interest. For example, if the process determines that the object is an object of interest within a threshold confidence level the process may proceed to 712. On the other hand, if the process determines that the object is not an object of interest, such as a bird, small balloon, or the like, the process may return to block 602 of FIG. 6.

At 712, the computing device may determine a current trajectory and velocity of the object of interest. For example, based on parallax calculations of images captured from multiple points of view, change in position of the object over multiple frames, or the like, the computing device may determine the trajectory and the velocity of the object of interest. Further, in some examples, this operation may be performed before block 708 or before block 706, rather than at block 712.

At 714, the computing device may determine whether to perform an action based on the determined trajectory and velocity of the object of interest. For example, if the object of interest is heading away from the designated volume, then no action may be required, and the process may return to block 602 of FIG. 6. On the other hand if the object of interest appears likely to enter the designated volume, then the process goes to 716. Further, in some examples, when making the determination as to whether to perform an action, the computing device may determine the location and trajectory of any UAVs currently operating within the designated volume. For example, the designated volume is quite large and a UAV is outside of a threshold distance from the trajectory of the object of interest, then the computing device may continue to monitor the trajectory of the object of interest rather than instructing the UAV to land or the like.

At 716, the computing device may perform at least one action such as sending an instruction to the UAV, sending a notification to the user computing device, and so forth. Furthermore, while an example process has been set forth above with respect to FIGS. 6 and 7, numerous variations will be apparent to those of skill in the art having the benefit of the disclosure herein.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 8:
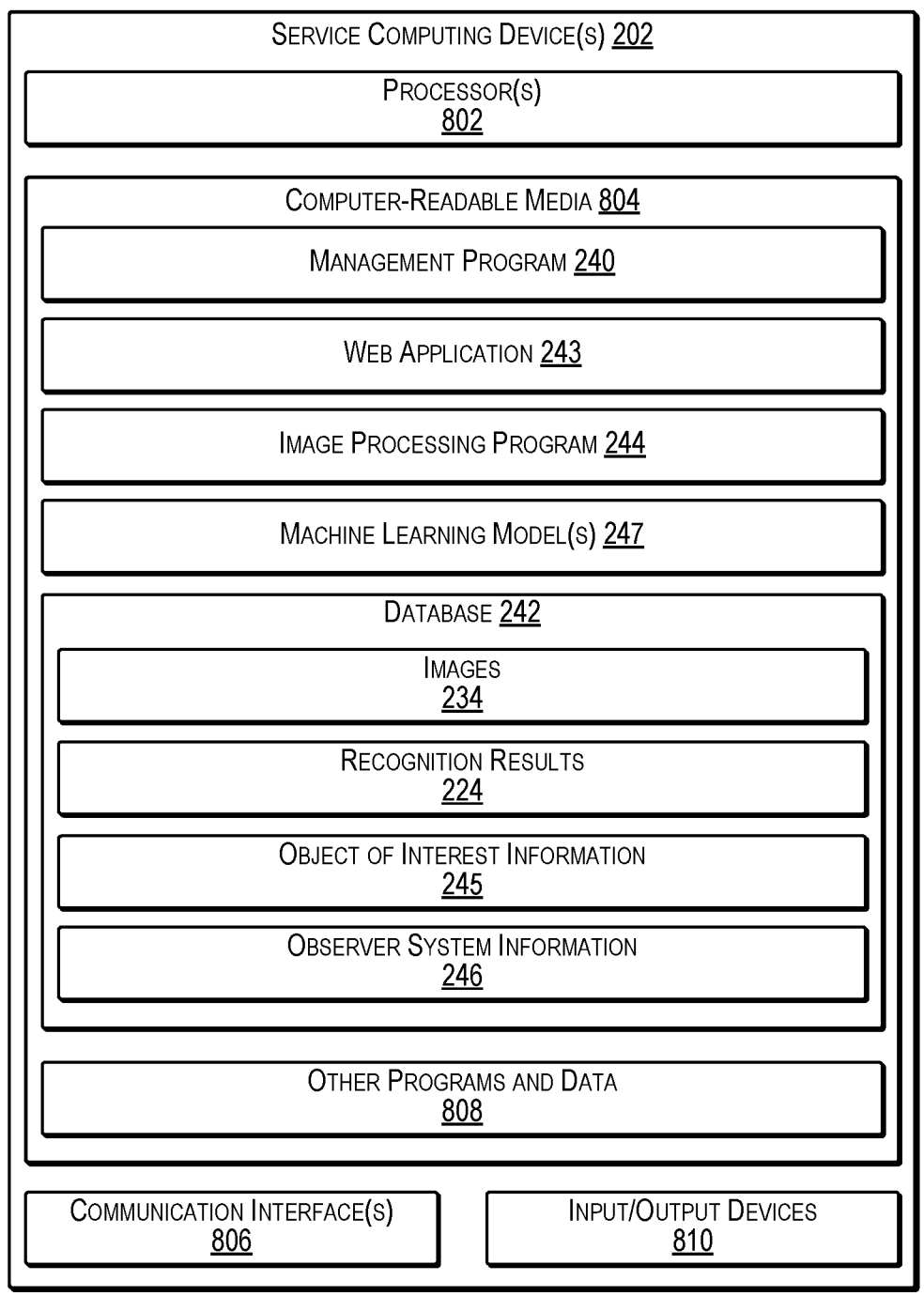
FIG. 8 illustrates select components of an example service computing device that may be used to implement some of the functionality described herein.

FIG. 8 illustrates select components of an example service computing device 202 that may be used to implement some of the functionality described herein. The service computing device 202 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used.

Further, while the figures illustrate the functional components and data of the service computing device 202 as being present in a single location, these components and data may alternatively be distributed across different service computing devices and different locations in any manner. Consequently, the functions may be implemented by one or more service computing devices, with the various functionality described above distributed in various ways across the different computing devices. Multiple service computing devices 202 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 202 may include one or more processors 802, one or more computer-readable media 804, and one or more communication interfaces 806. Each processor 802 may be a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. Such computer-readable media 804 may include, but is not limited to, RAM, ROM, EEPROM, flash memory or other memory technology, optical storage, solid state storage, magnetic tape, magnetic disk storage, storage arrays, network attached storage, storage area networks, cloud storage, or any other medium that can be used to store the desired information and that can be accessed by a computing device. Depending on the configuration of the service computing device 202, the computer-readable media 804 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 804 may be used to store any number of functional components that are executable by the processor(s) 802. In many implementations, these functional components comprise instructions or programs that are executable by the processors 802 and that, when executed, specifically configure the one or more processors 802 to perform the actions attributed above to the service computing device 202. Functional components stored in the computer-readable media 804 may include the management program 240, the web application 243, the image processing program 244, and the one or more machine learning models 247.

In addition, the computer-readable media 804 may store data and data structures used for performing the operations described herein. Thus, the computer-readable media 804 may store the database 242, which may include the images 234, the recognition results 224, the object of interest information 245, and the observer system information 246. In addition, the computer-readable media 804 may store or otherwise maintain the machine-learning models 247 and associated training, validation, and testing data, and other model building data.

The service computing device 202 may also include or maintain other functional components and data not specifically shown in FIG. 8, such as other programs and data 808, which may include programs, drivers, etc., and the data used or generated by the functional components. Further, the service computing device 202 may include many other logical, programmatic, and physical components, of which those described above are merely examples that are related to the discussion herein.

The communication interface(s) 806 may include one or more interfaces and hardware components for enabling communication with various other devices, such as over the network(s) 106. For example, communication interface(s) 806 may enable communication through one or more of the Internet, cable networks, cellular networks, wireless networks (e.g., Wi-Fi, radio) and wired networks (e.g., fiber optic and Ethernet), as well as close-range communications, such as BLUETOOTH®, as well as other communication technologies as enumerated additionally elsewhere herein.

The service computing device 202 may further be equipped with various input/output (I/O) devices 810. Such I/O devices 810 may include a display, various user interface controls (e.g., buttons, joystick, keyboard, mouse, touch screen, etc.), audio speakers, connection ports and so forth.

Figure 9:
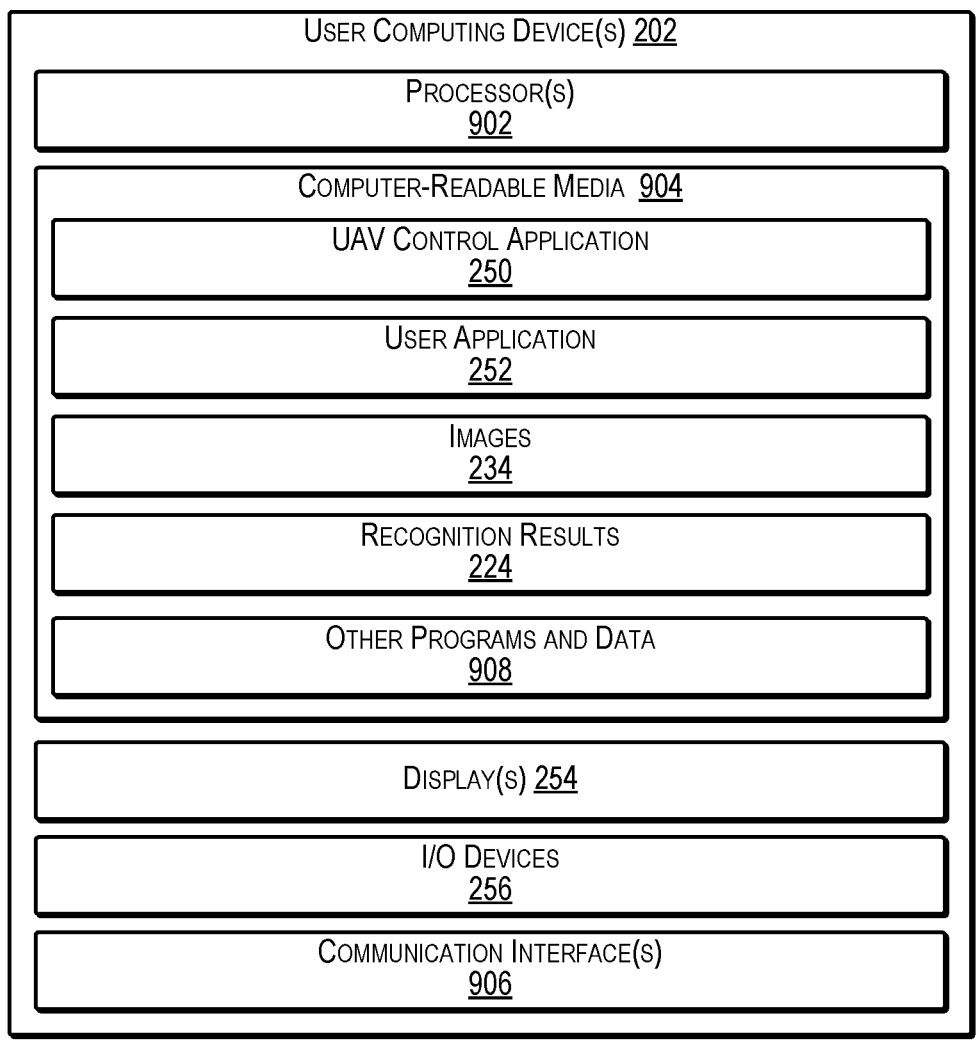
FIG. 9 illustrates select components of an example user computing device according to some implementations.

FIG. 9 illustrates select components of an example user computing device 204 according to some implementations. In some cases, the user computing device 204 may have a hardware configuration similar to that of the service computing device 202, but with additional or different functional components as discussed above. For instance, a processor 902 may include any of the processors 802, a computer readable media 904 may include any of the computer readable media 804, communication interfaces 906 may include any of the communication interfaces 806, and so forth. Further, the user computing device 204 is not limited to the components described for the service computing device 202, but may include additional or alternative components, as discussed elsewhere herein.

The computer-readable media 904 may be used to store any number of functional components that are executable by the processor(s) 902. In many implementations, these functional components comprise instructions or programs that are executable by the processors 902 and that, when executed, specifically configure the one or more processors 902 to perform the actions attributed above to the user computing device 204. Functional components stored in the computer-readable media 904 may include the UAV control application 250 and the user application 252. As one example, the user application 252 may include a browser that executes the web application 243 discussed above with respect to FIG. 2. Further, in some examples, the user computing device 204 may include the image processing program 244 and machine learning models 247 (not shown in FIG. 9), such as in the case that the user computing device aggregates and processes images from the observer devices.

In addition, the computer-readable media 904 may store data and data structures used for performing the operations described herein. Thus, the computer-readable media 804 may store, at least temporarily, the images 234 and the recognition results 224. In addition, the user computing device 204 may also include or maintain other functional components and data not specifically shown in FIG. 9, such as other programs and data 908, which may include programs, drivers, etc., and the data used or generated by the functional components. Further, the user computing device 204 may include many other logical, programmatic, and physical components, of which those described above are merely examples that are related to the discussion herein.

In addition, the user computing device 204 may include the display(s) 254 and the I/O devices 256. In some cases, the I/O devices 256 may include a graphic user interface (not shown in FIG. 9) for controlling the UAV 106 and reviewing data (e.g., images) received from the UAV 106. In some examples, the display(s) 254 may include a touchscreen that may provide virtual controls and status indicators for controlling and viewing a status of the UAV 106. In addition, the user interface may include an image (e.g., a live video image) of a current field of view of a camera onboard a UAV, such as the UAV 106.

Figure 10:
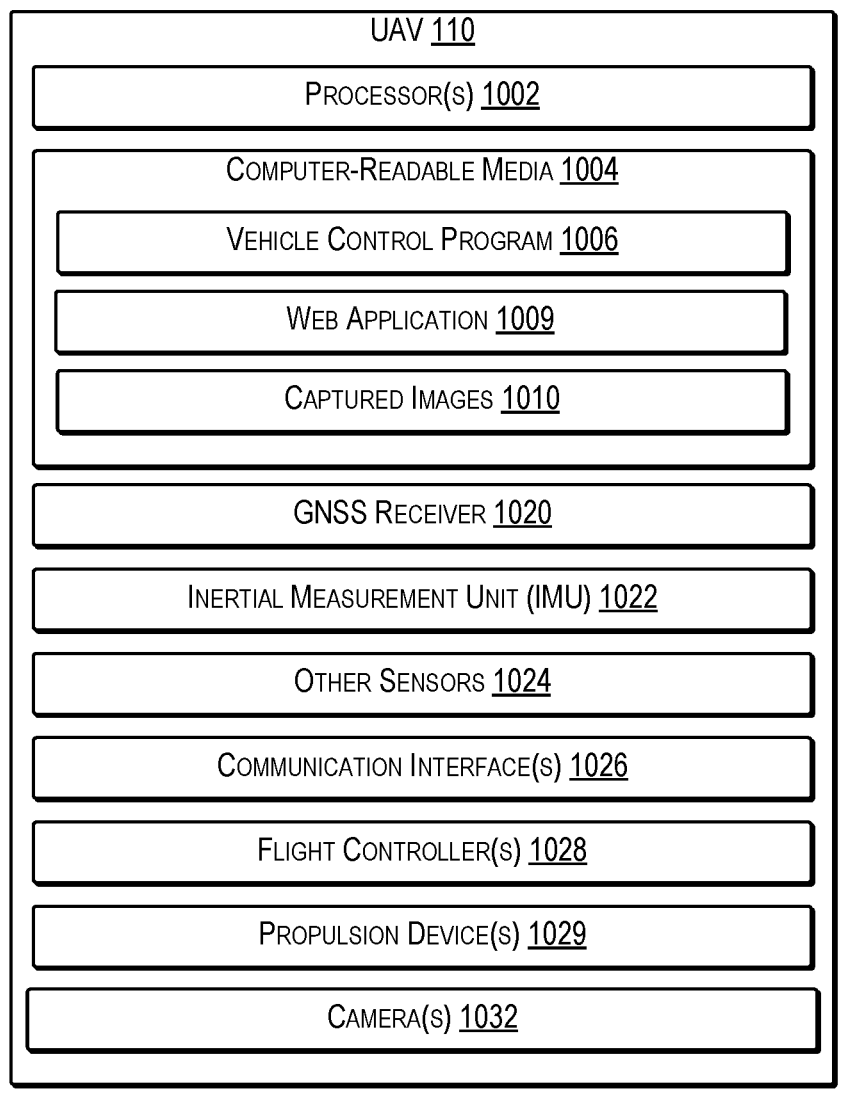
FIG. 10 illustrates select components of an example UAV according to some implementations.

FIG. 10 illustrates select components of an example UAV 110 according to some implementations. In the examples herein, the UAV 110 may support and transport an observer device 102, e.g., as discussed above with respect to FIGS. 1-4. The UAV 110 may sometimes be referred to as a "drone" and may be implemented as any type of UAV capable of controlled flight without a human pilot onboard. For instance, the UAV 110 may be controlled autonomously by one or more onboard processors 1002 that execute one or more executable programs. Additionally, or alternatively, the UAV 110 may be controlled via a remote controller, such as through being operated by the user 249 as a human pilot and/or controlled by an executable program executing on or in cooperation with the user computing device 204.

In the illustrated example, the UAV 110 includes one or more processors 1002, one or more computer readable media 1004, and one or more communication interfaces 1026. For example, the one or more processors 1002 may include any of the processors 802 discussed above with respect to FIG. 8, the computer readable media 1004 may include any of the computer readable media 804 discussed above, and the communication interfaces 1026 may include any of the communication interfaces 806 discussed above.

The computer-readable media 1004 may be used to store any number of functional components that are executable by the processor(s) 1002. In many implementations, these functional components comprise instructions or programs that are executable by the processors 1002 and that, when executed, specifically configure the one or more processors 1002 to perform at least some of the actions attributed above to the UAV 110. Functional components stored in the computer-readable media 1004 may include a vehicle control program 1006 that may receive inputs and perform processing for controlling navigation and other functions of the UAV 110. The functional components may further include a web application 1009 that may be provided by the UAV 110 to the user computing device 204 or other user device, such as a mobile device or the controller. For example, the web application 1009 may execute on a browser on the user computing device 204, such as to enable the user 249 to receive images of a current view of the camera of the UAV 110.

In addition, the computer-readable media 1004 may store, at least temporarily captured images 1010 that may be captured by at least one onboard camera 1012. In addition, the UAV 110 may include many other logical, programmatic, and physical components, of which those described herein are merely examples that are related to the discussion.

To assist in navigation, the UAV 110 may include a global navigation satellite system (GNSS) receiver 1020 onboard the UAV 110. The GNSS receiver 1020 may be able to receive signals from one or more satellites of a GNSS, such as the Global Positioning Satellite (GPS) system, the Russian Global Navigation Satellite System (GLONASS), the Chinese BeiDou Navigation Satellite System (BDS), the European Union's Galileo system, the Japanese Quasi-Zenith Satellite System (QZSS), the Indian Regional Navigation Satellite System (IRNSS), and so forth.

The UAV 110 may further include an inertial measurement device (IMU) 1022. In some examples, the IMU 1022 may be configured to detect linear acceleration using one or more accelerometers and to detect rotational rate using one or more gyroscopes. As one example, the IMU 1022 may be a self-contained system with a three-axis gyroscope, a three-axis accelerometer, and an embedded processor for processing inputs from the gyroscope and the accelerometer for providing an output of acceleration, attitude, and the like. For instance, the IMU 1022 may measure and report the velocity, acceleration, orientation, and gravitational forces on the UAV 110, such as by using the combination of the gyroscopes and accelerometers. In addition, the UAV 110 may include other sensors 1024, such as a magnetometer, a barometer, proximity sensors, lidar, radar, ultrasonic, or any of various other types of sensors as is known in the art.

Furthermore, the UAV 110 may include one or more flight controllers 1028, one or more propulsion devices 1029, and one or more cameras 1032. The components included in the UAV 110 may be able to communicate at least with the one or more processors 1002, such as over one or more communication buses, signal lines, or the like (not shown).

The UAV 110 may include more or fewer components than shown in the example of FIG. 10, may combine two or more components as functional devices, or may have a different configuration or arrangement of the components. Some of the various components of the example UAV 110 shown in FIG. 10 may be implemented in hardware, software or a combination of both hardware and software, including one or more signal processing and/or application specific integrated circuits. The UAV 106 may have a configuration similar to that of the UAV 110 discussed above.

The propulsion devices 1029 may comprise motors and propellers. The propellers may be fixed pitch, or alternatively, may include variable-pitch propellers (varied, for example, using a gimbal mechanism). Alternatively, the propulsion devices may include one or more variable-pitch jet engines, or any other mode of propulsion device and associated actuators having the effect of providing force. The propulsion devices 1029 may include a controller for varying the applied thrust, for example, via an electronic speed controller controlled by or included in the flight controller(s) 1028 for varying the speed of each propeller.

The flight controller(s) 1028 may include a combination of hardware and/or software configured to receive input data (e.g., sensor data, image data, generated trajectories, or other instructions) from the vehicle control program 1006, interpret the data and/or instructions, and output control signals to the propulsion devices 1029 of the UAV 110. Alternatively, or in addition, the flight controller(s) 1028 may be configured to receive control commands generated by another component or device (e.g., processors 1002), interpret those control commands and generate control signals to the propulsion devices 1029 of the UAV 110.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
a first device including a plurality of cameras and at least one processor, the at least one processor configured by executable instructions to:
receive, from a first camera of the plurality of cameras, a plurality of images of an airspace corresponding to an area of operation of a first unmanned aerial vehicle (UAV);
detect, based on the plurality of images from the first camera, using at least a first computer vision algorithm, a candidate object approaching or within the airspace;
determine, based on a second computer vision algorithm, an indication of whether an output of the first computer vision algorithm is correct;
based at least on detecting the candidate object and determining that the output of the first computer vision algorithm is indicated to be correct, control movement of a movable camera of the plurality of cameras to direct a field of view of the movable camera toward the candidate object;
receive images from the movable camera captured at a first location of the first device, and receiving images from a second camera captured at a second location of a second device;
determine, based on the images from the first movable camera and the images from the second camera that the candidate object is an object of interest; and
perform at least one action based on determining that the candidate object is the object of interest.

2. The system as recited in claim 1, the at least one processor further configured by the executable instructions to perform, as the at least one action, at least one of:
sending an instruction to cause the first UAV to perform an action based on the object of interest; or
sending a notification to a computing device to provide information related to the object of interest.

3. The system as recited in claim 1, the at least one processor further configured by the executable instructions to use a third computer vision algorithm to determine, based on the images from the movable camera and the images from the second camera at the second location, that the candidate object is an object of interest.

4. The system as recited in claim 1, wherein the first device includes a plurality of radially arranged fixed cameras including the first camera, and wherein the movable camera is mounted between fields of view of two of the radially arranged fixed cameras.

5. The system as recited in claim 1, the at least one processor further configured by the executable instructions to:
based on detecting the candidate object, send, to the second device, at least an indication of a location of the candidate object; and
receive, at least partially in response to sending the indication of the location, the images from the second camera.

6. The system as recited in claim 1, wherein the movable camera has a level of optical magnification that is greater than an optical magnification of the first camera.

7. A method comprising:
receiving, by one or more processors, from a first camera, a plurality of images of an airspace corresponding to an area of operation of a first unmanned aerial vehicle (UAV);
detecting, using a first computer vision algorithm, and based on the plurality of images from the first camera, a candidate object approaching or within the airspace;
determining, based on a second computer vision algorithm, an indication of whether an output of the first computer vision algorithm is correct;
based on detecting the candidate object and determining that the output of the first computer vision algorithm is indicated to be correct, controlling a second camera to direct a field of view of the second camera toward the candidate object;
determining, based on images from the second camera captured at a first location and images from at least one other camera captured at a second location that the candidate object is an object of interest; and
performing at least one action based on determining that the candidate object is the object of interest.

8. The method as recited in claim 7, wherein performing the at least one action includes at least one of:
sending an instruction to cause the first UAV to take an action based on the object of interest; or
sending a notification to a computing device to provide information related to the object of interest.

9. The method as recited in claim 7, further comprising using a third computer vision algorithm to determine, based on images from the second camera and images from at least one other camera at the second location that the candidate object is an object of interest.

10. The method as recited in claim 7, wherein the determining, based on the images from the second camera captured at the first location and the images from the at least one other camera captured at the second location that the candidate object is the object of interest is performed by a processor onboard the first UAV.

11. The method as recited in claim 7, wherein the determining, based on the images from the second camera captured at the first location and the images from the at least one other camera captured at the second location that the candidate object is the object of interest is performed by a computing device located over a network from at least one of the second camera or the other camera.

12. The method as recited in claim 7, further comprising:
receiving information related to a communication broadcasted by the object of interest, the communication indicating a location of the object of interest; and
determining that the candidate object is the object of interest based partially on the communication.

13. The method as recited in claim 7, wherein at least one of the second camera or the other camera is mounted on a second UAV.

14. The method as recited in claim 7, wherein the second camera has a level of optical magnification that is greater than an optical magnification of the first camera.

15. An apparatus comprising:
a plurality of cameras and at least one processor configured by executable instructions to perform operations comprising:
receiving, from a first camera of the plurality of cameras, a plurality of images of an airspace corresponding to an area of operation of a first unmanned aerial vehicle (UAV);
detecting, using a first computer vision algorithm, and based on the plurality of images from the first camera, a candidate object approaching or within the airspace;
determining, based on a second computer vision algorithm, an indication of whether an output of the first computer vision algorithm is correct;
based on detecting the candidate object and determining that the output of the first computer vision algorithm is indicated to be correct, controlling movement of a movable camera of the plurality of cameras to direct a field of view of the movable camera toward the candidate object; and
sending images captured using the movable camera at a first location to at least one of the first UAV or a computing device located over a network, the at least one of the first UAV or the computing device configured to perform recognition on the sent images.

16. The apparatus as recited in claim 15, the operations further comprising sending an indication of a location of the candidate object to another apparatus, the sending causing, at least in part, the other apparatus to direct a field of view of a movable camera of the other apparatus toward the candidate object.

17. The apparatus as recited in claim 15, the operations further comprising:
receiving information related to a communication broadcasted by the object of interest, the communication indicating a location of the object of interest; and
determining that the candidate object is the object of interest based partially on the communication.

18. The apparatus as recited in claim 15, wherein:
the plurality of cameras comprises a plurality of radially arranged cameras including the first camera; and
the movable camera is mounted between fields of view of two of the radially arranged cameras.

19. The apparatus as recited in claim 15, wherein the apparatus is mounted on a second UAV.

20. The apparatus as recited in claim 15, wherein the movable camera has a level of optical magnification that is greater than an optical magnification of the first camera.

* * * * *